United States Patent
Coenegracht

(10) Patent No.: US 10,393,978 B2
(45) Date of Patent: *Aug. 27, 2019

(54) SEAL ACTUATOR WITH ACTUATION LEVEL INDICATOR

(71) Applicant: CommScope Connectivity Belgium BVBA, Kessel-Lo (BE)

(72) Inventor: Philippe Coenegracht, Hasselt (BE)

(73) Assignee: CommScope Connectivity Belgium BVBA, Kessel-Lo (BE)

(*) Notice: Subject to any disclaimer, the term of this patent is extended or adjusted under 35 U.S.C. 154(b) by 0 days.

This patent is subject to a terminal disclaimer.

(21) Appl. No.: 15/665,868

(22) Filed: Aug. 1, 2017

(65) Prior Publication Data
US 2017/0329095 A1    Nov. 16, 2017

Related U.S. Application Data

(63) Continuation of application No. 14/412,386, filed as application No. PCT/EP2013/063500 on Jun. 27, 2013, now Pat. No. 9,753,237.
(Continued)

(51) Int. Cl.
   *G02B 6/44*  (2006.01)
   *H02G 3/08*  (2006.01)
   (Continued)

(52) U.S. Cl.
   CPC .......... *G02B 6/4444* (2013.01); *F16J 15/028* (2013.01); *H02G 3/088* (2013.01); *H02G 3/22* (2013.01); *H02G 15/013* (2013.01)

(58) Field of Classification Search
   CPC ...... H02G 15/013; H02G 15/04; H02G 15/10; H02G 15/113; H02G 15/117; H02G 3/083;
   (Continued)

(56) References Cited

U.S. PATENT DOCUMENTS

| 4,572,923 A | 2/1986 | Castellani et al. |
| 5,313,019 A | 5/1994 | Brusselmans et al. |

(Continued)

FOREIGN PATENT DOCUMENTS

| DE | 30 25 766 A1 | 1/1982 |
| DE | 31 29 489 A1 | 2/1983 |

(Continued)

OTHER PUBLICATIONS

International Search Report for International Application No. PCT/EP2013/063486 dated Feb. 6, 2014 (6 pages).
(Continued)

*Primary Examiner* — Nicholas L Foster
(74) *Attorney, Agent, or Firm* — Merchant & Gould P.C.

(57) ABSTRACT

An enclosure includes a sealing unit including a sealant arrangement for defining and sealing cable ports and for providing a peripheral seal between a housing and the sealing unit. An actuation arrangement pressurizes the sealant arrangement. An indicator arrangement indicates to a user that an actuator has been sufficiently moved to fully actuate the sealant arrangement. Example indicator arrangements include indicia visible through viewing windows and/or aligning structures. Example indicator arrangements can include structure for accounting for sealant shrinkage over time.

18 Claims, 17 Drawing Sheets

Related U.S. Application Data

(60) Provisional application No. 61/667,224, filed on Jul. 2, 2012, provisional application No. 61/726,821, filed on Nov. 15, 2012.

(51) Int. Cl.
*H02G 3/22* (2006.01)
*F16J 15/02* (2006.01)
*H02G 15/013* (2006.01)

(58) Field of Classification Search
CPC ........ H02G 3/088; H02G 3/22; G02B 6/4444; F16J 15/028; F16J 15/06; F16J 15/064; F16J 15/104; F16J 15/14
See application file for complete search history.

(56) References Cited

U.S. PATENT DOCUMENTS

| | | | |
|---|---|---|---|
| 5,446,823 A | 8/1995 | Bingham et al. | |
| 5,455,391 A | 10/1995 | Demesmaeker et al. | |
| 5,756,972 A | 5/1998 | Vranicar et al. | |
| 5,764,844 A | 6/1998 | Mendes | |
| 5,774,618 A | 6/1998 | Jones | |
| 5,775,702 A | 7/1998 | Laeremans et al. | |
| 6,046,406 A | 4/2000 | Milanowski et al. | |
| 6,088,886 A | 7/2000 | Gyöngyösi | |
| 6,100,472 A | 8/2000 | Foss | |
| 7,038,137 B2 | 5/2006 | Grubish et al. | |
| 8,050,528 B2* | 11/2011 | Shimirak | H02G 15/013 174/77 R |
| 8,275,229 B2* | 9/2012 | Shimirak | H02G 15/013 174/77 R |
| 8,604,360 B2 | 12/2013 | Knorr et al. | |
| 9,250,407 B2* | 2/2016 | Vastmans | G02B 6/4444 |
| 9,394,442 B2 | 7/2016 | Adams et al. | |
| 9,400,363 B2* | 7/2016 | Coenegracht | H02G 15/013 |
| 9,502,878 B2 | 11/2016 | Coenegracht et al. | |
| 9,512,920 B2* | 12/2016 | Vastmans | G02B 6/4444 |
| 2002/0146229 A1 | 10/2002 | Roberts | |
| 2003/0156798 A1 | 8/2003 | Cull | |
| 2004/0080119 A1 | 4/2004 | Goll | |
| 2004/0100028 A1 | 5/2004 | Desard et al. | |
| 2006/0063418 A1 | 3/2006 | Motzigkeit | |
| 2009/0304341 A1 | 12/2009 | Shimirak et al. | |
| 2009/0309313 A1 | 12/2009 | Knorr et al. | |
| 2011/0268416 A1* | 11/2011 | Shimirak | H02G 15/013 385/135 |
| 2011/0272894 A1* | 11/2011 | Shimirak | H02G 15/013 277/602 |
| 2013/0014974 A1 | 1/2013 | Burke et al. | |
| 2013/0020771 A1 | 1/2013 | Vanhentenrijk et al. | |
| 2013/0320631 A1 | 12/2013 | Vastmans et al. | |
| 2014/0041893 A1 | 2/2014 | Adams et al. | |
| 2014/0072266 A1 | 3/2014 | Vastmans et al. | |
| 2015/0137461 A1 | 5/2015 | Coenegracht et al. | |
| 2015/0155696 A1 | 6/2015 | Coenegracht et al. | |
| 2015/0168664 A1 | 6/2015 | Coenegracht et al. | |
| 2016/0320580 A1 | 11/2016 | Cornelisson et al. | |

FOREIGN PATENT DOCUMENTS

| | | |
|---|---|---|
| DE | 33 22 809 A1 | 1/1985 |
| DE | 20 2006 006 019 U1 | 7/2006 |
| DE | 20 2011 003 754 U1 | 8/2012 |
| DE | 10 2012 112 510 | 6/2014 |
| EP | 0 442 941 B1 | 1/1995 |
| EP | 0 638 976 A1 | 2/1995 |
| EP | 0 652 619 A1 | 5/1995 |
| EP | 0 587 616 B1 | 7/1996 |
| EP | 0 426 658 B1 | 11/1996 |
| EP | 0 681 598 B1 | 9/1997 |
| EP | 0 841 734 A1 | 5/1998 |
| EP | 1 710 882 A1 | 10/2006 |
| EP | 2 330 706 A1 | 6/2011 |
| WO | 95/24756 A1 | 9/1995 |
| WO | 96/32660 A1 | 10/1996 |
| WO | 97/42693 A1 | 11/1997 |
| WO | 99/56370 A1 | 11/1999 |
| WO | 01/28057 A1 | 4/2001 |
| WO | 02/33796 A2 | 4/2002 |
| WO | 02/063736 A1 | 8/2002 |
| WO | 02/097488 A2 | 12/2002 |
| WO | 2004/051338 A1 | 6/2004 |
| WO | 2005/027290 A1 | 3/2005 |
| WO | 2006/118747 A1 | 11/2006 |
| WO | 2007/118548 A1 | 10/2007 |
| WO | 2007/137717 A1 | 12/2007 |
| WO | 2008/112118 A2 | 9/2008 |
| WO | 2009/148604 A1 | 12/2009 |
| WO | 2011/067190 A2 | 6/2011 |
| WO | 2012/152789 | 11/2012 |
| WO | 2014/095462 A1 | 6/2014 |

OTHER PUBLICATIONS

International Search Report for International Application No. PCT/EP2013/063495 dated Feb. 6, 2014 (5 pages).
International Search Report for International Application No. PCT/EP2013/063497 dated Feb. 6, 2014 (6 pages).
International Search Report for International Application No. PCT/EP2013/063500 dated Feb. 6, 2014 (7 pages).
Extended European Search Report for Application No. 18156496.4 dated May 8, 2018.

* cited by examiner

SEAL ACTUATOR WITH ACTUATION LEVEL INDICATOR

CROSS REFERENCE TO RELATED APPLICATIONS

This application is a continuation of application Ser. No. 14/412,386, filed Dec. 31, 2014, now U.S. Pat. No. 9,753,237, which is a National Stage Application of PCT/EP2013/063500, filed Jun. 27, 2013, which claims benefit of U.S. Provisional Ser. No. 61/667,224, filed Jul. 2, 2012 and U.S. Provisional Ser. No. 61/726,821, filed Nov. 15, 2012, and which applications are incorporated herein by reference. To the extent appropriate, a claim of priority is made to each of the above disclosed applications.

TECHNICAL FIELD

The present disclosure relates generally to telecommunications equipment. More particularly, the present disclosure relates to sealed enclosures used in telecommunication systems.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers. It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures.

Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941 B1 and document EP 0587616 B1. Both of these documents disclose gel-type cable seals that are pressurized through the use of threaded actuators. Document U.S. Pat. No. 6,046,406 discloses a cable seal that is pressurized through the use of an actuator including a cam lever. While pressurized cable seals have generally proven to be effective, improvements in this area are still needed.

SUMMARY

One aspect of the present disclosure relates to a cable sealing unit having an actuator for applying spring pressure to a sealant of the cable sealing unit, and an indicator that provides a visual indication of a level of spring pressure applied to the sealant (i.e., an actuation level) at the time of installation. In certain embodiments, the indicator provides the visual indication of the level of pressure initially applied at installation (i.e., the initial actuation level) even after the level of pressure has decreased over time due sealant volume reduction. In certain embodiments, the indicator includes means for accommodating sealant volume reduction (e.g., gel shrinkage due to oil bleed-out or other causes) over time. In certain embodiments, the indicator means includes an indicator member that moves relative to a sealant pressurization structure during initial sealant spring pressurization, and that moves with the pressurization structure as the pressurized sealant reduces in volume over time. In certain embodiments, the indicator member includes a first sleeve defining a window, the pressurization structure includes a second sleeve on which the first sleeve is mounted, and the second sleeve has a visual indication of spring actuation level that is visible through the window. In certain embodiments, a threaded actuator moves the first sleeve during initial pressurization of the sealant, and the first sleeve can move a limited amount relative to the threaded actuator after initial sealant pressurization to account for sealant shrinkage over time.

Another aspect of the present disclosure relates to an enclosure including: a housing having an end defining a sealing unit opening; and a sealing unit that fits within the sealing unit opening. The sealing unit defines cable ports. The sealing unit includes a sealant arrangement for defining and sealing the cable ports and for providing a peripheral seal between the housing and the sealing unit. The sealing unit also includes an actuation arrangement for pressurizing the sealant arrangement when the sealing unit has been installed within the sealing unit opening. The actuation arrangement includes inner and outer pressurization structures between which the sealant arrangement is positioned. The actuation arrangement also includes at least one actuator that is movable between a non-actuated position and an actuated position. The actuator generates a sealant pressurization force that presses the sealing arrangement between the first and second pressurization structures when the actuator is moved towards the actuated position. The sealing unit also includes an indicator arrangement configured to indicate to a user whether the actuator has been sufficiently moved to fully actuate the sealant arrangement.

A further aspect of the present disclosure relates to an indicator arrangement that allows a user to quickly and easily determine when a sealant actuator has been sufficiently moved (e.g., rotated, threaded, etc.) to fully compress and/or decompress a sealant arrangement used to form seals around cables. Accordingly, the user will not stop actuating the sealant actuator until the sealant arrangement is fully pressurized (i.e., pressurized sufficiently such that an effective seal has been formed about a cable routed through the sealant arrangement). In some implementations, the actuator is actuated using a threading action. In certain embodiments, the pressure level indication provided by the indicator arrangement will not change over time even if gel volume is lost. Thus, it is possible to quickly determine whether the actuator was fully/properly actuated at the time of initial installation. Thus, it is possible to assess whether a seal failure was the result of initial operator error or other causes.

In certain implementations, the actuator includes a handle threaded to a shaft and a cap disposed between the handle and a spring.

In some implementations, the indicator arrangement includes at least one indicium disposed at an indicia region located on the shaft. The handle defines a window through which the indicia region may be visible. In certain implementations, the indicium includes color. In certain implementations, the indicium includes a symbol.

In certain implementations, the indicia region is visible through the window when the sealant arrangement is fully actuated. In certain implementations, the indicia region is not visible through the window when the sealant arrangement is fully actuated. In certain implementations, a first indicia region is visible through the window when the sealant arrangement is not actuated and wherein a second indicia region is visible through the window when the sealant arrangement is fully actuated.

In some implementations, the indicator arrangement includes structures that align to indicate actuation of the sealant arrangement.

In certain implementations, the handle defines an open top through which the shaft is visible as the handle is threaded along the shaft. In one example implementation, the shaft is sized so that a distal end of the shaft is flush with the annular end surface at the top of the handle when the sealant arrangement is fully actuated.

In certain implementations, the indicator arrangement includes a first flange extending outwardly from an open top to the handle and a second flange extending outwardly from a distal end of the shaft. Each of the flanges defines an opening. In one example implementation, the opening of the first flange aligns with the opening of the second flange when the sealant arrangement is fully actuated.

In certain implementations, the actuation arrangement includes two spaced-apart actuators.

In certain implementations, the sealant arrangement includes a gel.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventions and inventive concepts upon which the embodiments disclosed herein are based.

DETAILED DESCRIPTION

Figure 1:
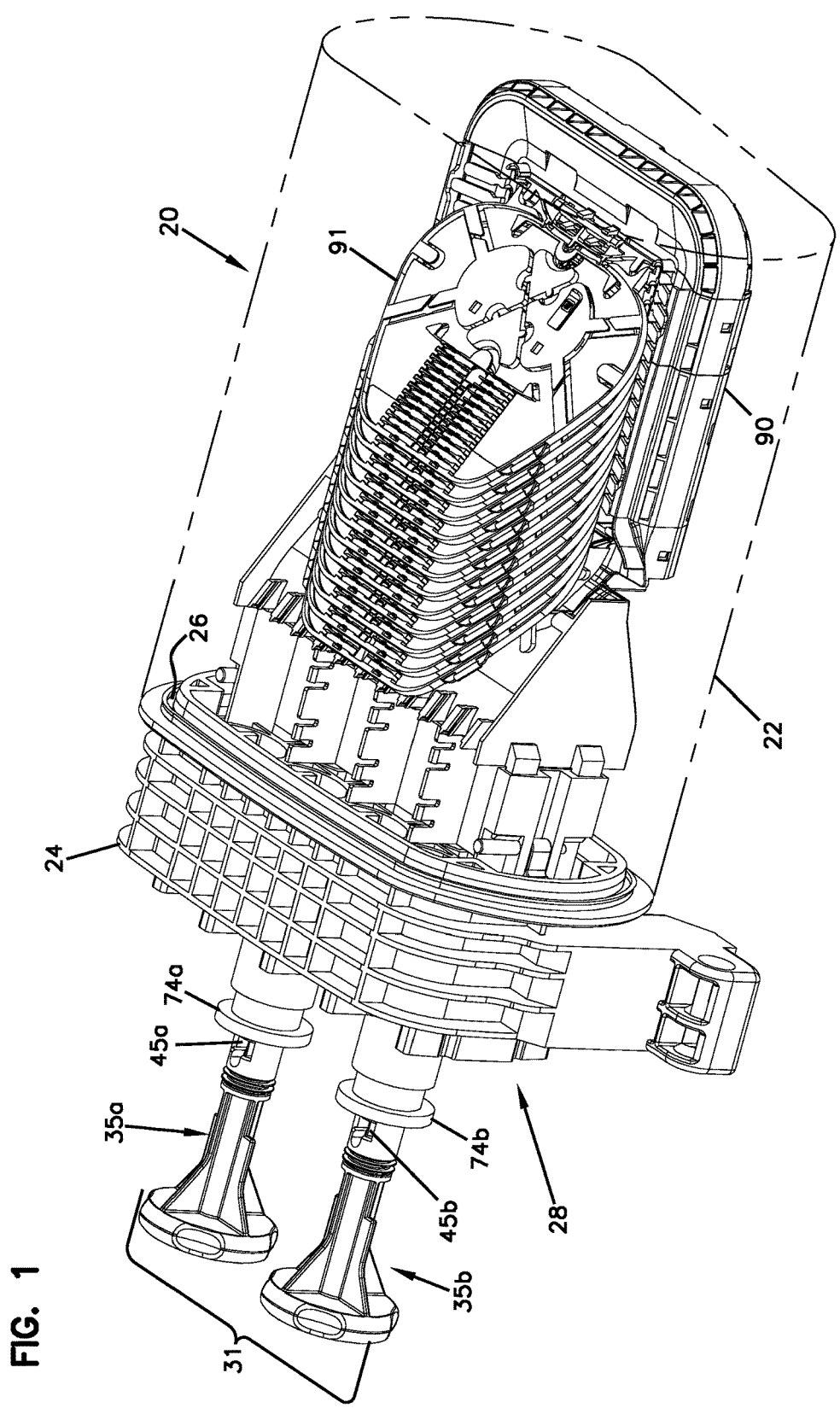
FIG. 1 is a perspective view of a telecommunications enclosure in accordance with the principles of the present disclosure, a sealing unit and internal telecommunications components are shown installed within a housing of the enclosure.

FIG. 1 shows a telecommunications enclosure 20 in accordance with the principles of the present disclosure. The enclosure 20 includes a housing 22 having an end 24 defining a sealing unit opening 26. In the example shown, the housing 22 includes a base defining the sealing unit opening 26. The housing 22 also may include cover (see dashed lines) that mounts to the base. The enclosure 20 also includes a sealing unit 28 (see FIG. 3) that fits within the sealing unit opening 26. A frame 90 supporting fiber optic components 91 (e.g., optical splice trays, optical splitter trays, etc.) is carried with the sealing unit 28. The sealing unit 28 includes a sealant arrangement 32 defining a plurality of main cable ports 30 (see FIG. 2). When pressurized, the sealant arrangement 32 is configured for providing seals about structures (e.g., cables, plugs, etc.) routed though the main cable ports 30 and is also configured for providing a peripheral seal between the housing 22 and the cable sealing unit 28.

Figure 2:
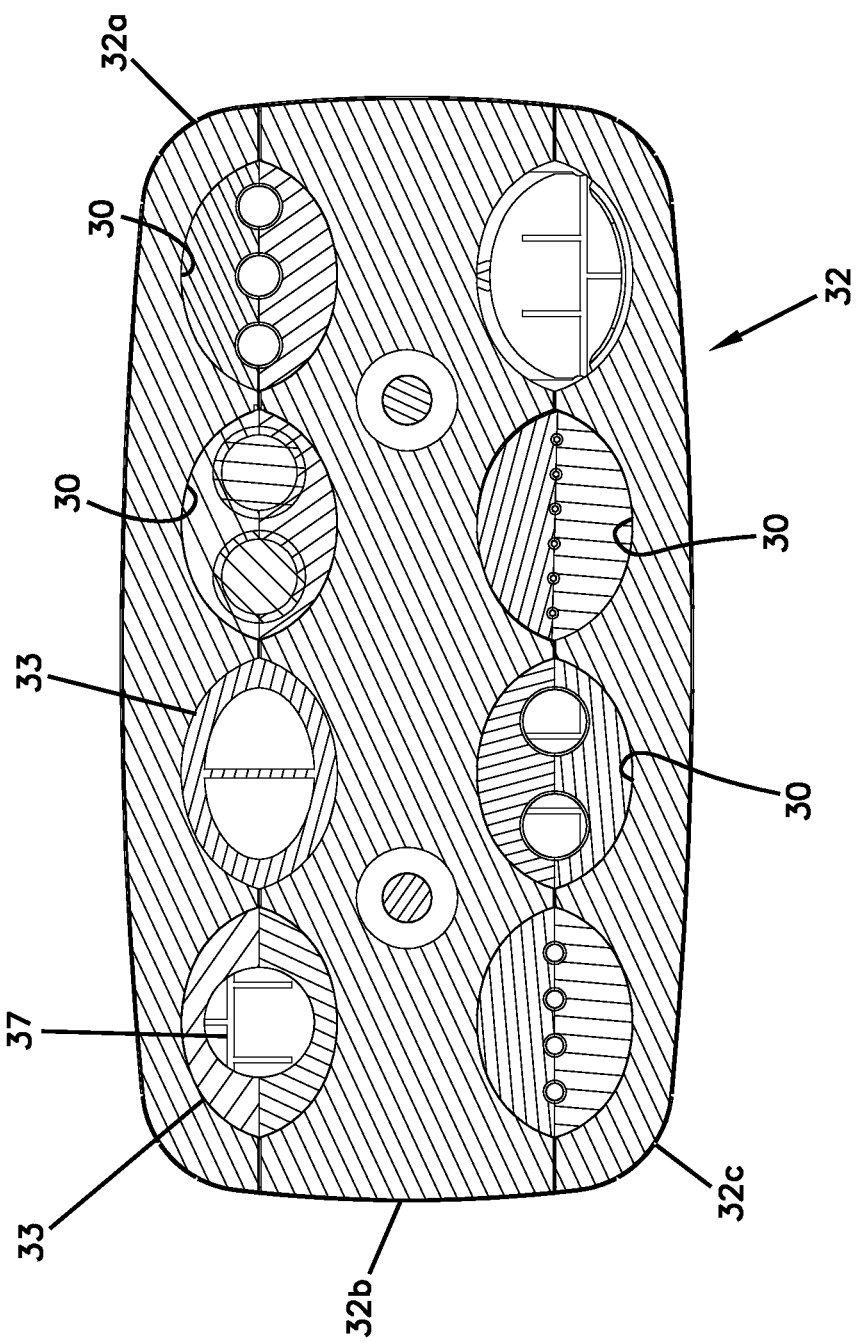
FIG. 2 is a cross-sectional view taken of a sealing arrangement suitable for use with the sealing units disclosed herein.

Referring to FIG. 2, the sealant arrangement 32 includes multiple portions of sealant (e.g., gel blocks) that cooperate to form a collective volume of sealant that is pressurized by an actuation arrangement 31. For example, the sealant arrangement 32 includes sealant portions 32a, 32b and 32c that cooperate to define the main cable ports 30. The main cable ports 30 are sized to receive and seal relatively large telecommunication cables. To allow the main cable ports 30 to accommodate smaller cables, the cable sealing arrangement 32 can include port diameter reducers 33 that mount in the main cable ports 30. The port diameter reducers 33 can be constructed of sealant and can define one or more reduced-size cable ports 37 that are smaller in diameter than the main cable ports 30. The port diameter reducers 33 are shown being configured to accommodate one, two, three, four or six reduced size cables. The port diameter reducers can define ports with non-cylindrical shapes to accommodate cables having non-cylindrical profiles.

Figure 3:
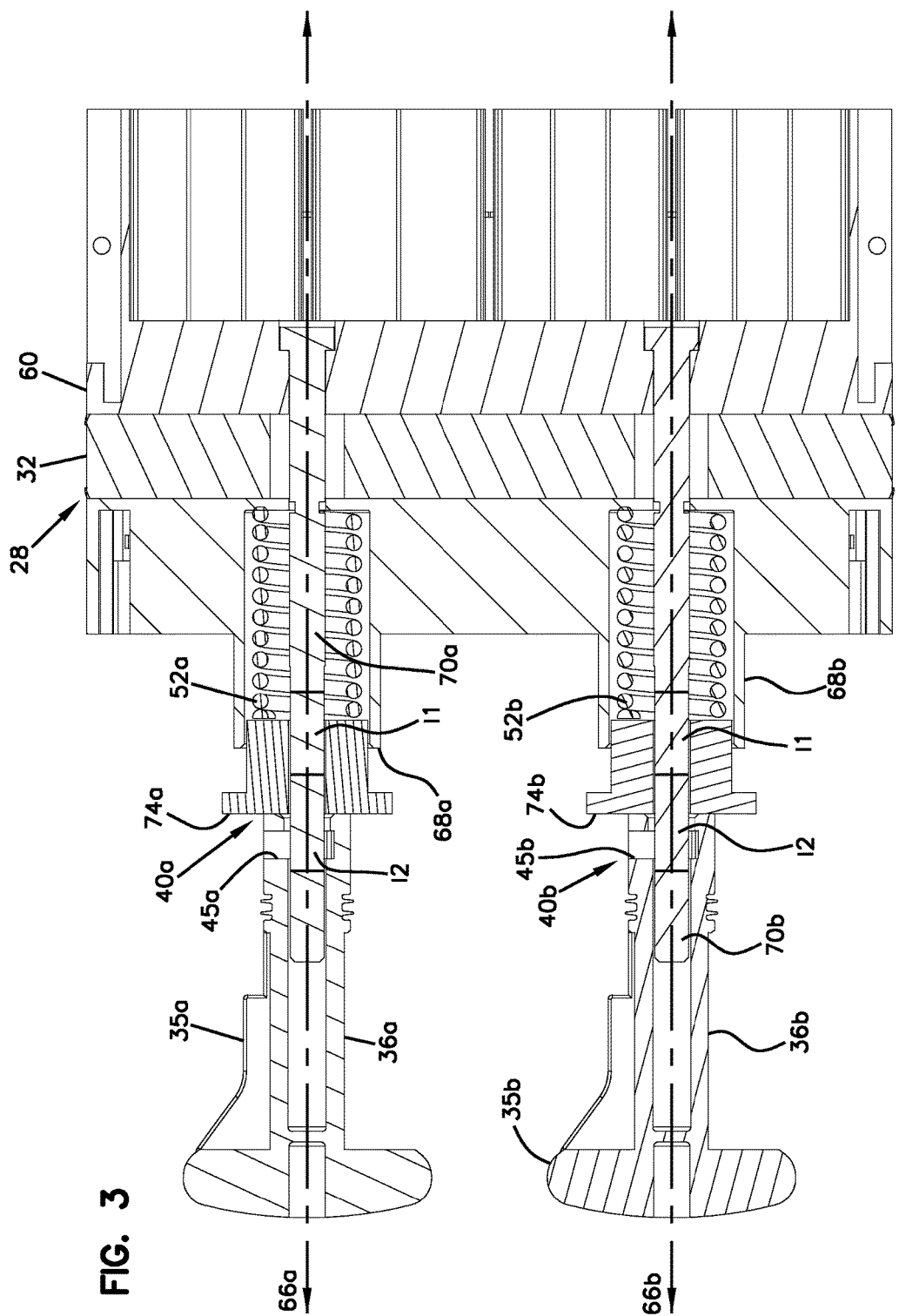
FIG. 3 is a cross-sectional view of the actuator arrangement of FIG. 1 shown with an example indicator arrangement configured in accordance with the principles of the present disclosure.

The enclosure 20 further includes the actuation arrangement 31 for pressurizing the sealant arrangement 32 within the sealing unit opening 26. The actuation arrangement 31 includes first and second actuators 35a, 35b (see FIG. 1). The sealant arrangement 32 is pressurized as the first and second actuators 35a, 35b are moved from non-actuated positions toward actuated positions. Referring to FIG. 3, the actuation arrangement 31 also includes inner and outer pressurization structures 60, 62 (e.g., plates, members, bodies, etc.). The frame 90 can be attached to the inner pressurization structure 60 (see FIG. 1). The sealant arrangement 32 is positioned between the inner and outer pressurization structures 60, 62.

Referring to FIG. 3, the actuators 35a, 35b include internally threaded handles 36a, 36b and caps 74a, 74b (see FIG. 3). The actuators 35a, 35b also include springs 52a, 52b corresponding to each of the first and second internally threaded handles 36a, 36b for transferring seal pressurization forces from the first and second internally threaded handles 36a, 36b to the sealant arrangement 32. The first and second springs 52a, 52b are aligned along spaced-apart, parallel axes 66a, 66b that coincide with spaced-apart first and second force application locations. The outer pressurization structure 62 includes first and second spaced-apart spring sleeves 68a, 68b that respectively receive the first and second springs 52a, 52b.

The first and second actuators 35a, 35b include first and second shafts 70a, 70b that extend respectively through the first and second springs 52a, 52b. The first and second shafts 70a, 70b have inner ends and outer ends. The inner ends of the first and second shafts 70a, 70b are connected to the inner pressurization structure 60. In certain embodiments, the inner ends of the shafts 70a, 70b are prevented from rotation relative to the inner pressurization structure 60. For example, the inner ends of the shafts 70a, 70b can include heads having flats (e.g., hex-heads) that fit within mating openings (e.g., hexagonal openings) defined by the inner pressurization structure 60. The internally threaded handles 36a, 36b are threaded on external threads of shafts 70a, 70b. By threading the handles 36a, 36b onto the shafts 70a, 70b, the caps 74a, 74b are forced inwardly toward the outer pressurization structure 62 to compress the springs 52a, 52b and tension the shafts 70a, 70b and thereby cause the sealant arrangement 32 to be pressurized between the inner and outer pressurization structures 60, 62.

When the sealant arrangement 32 is compressed between the first and second pressurization structures 60, 62, the sealant arrangement 32 flows or otherwise moves to fill the voids in the sealant unit 28 and forms a peripheral seal with the housing 22 and also forms seals around any cables that have been routed through the cable ports 30, 37. By unthreading the handles 36a, 36b from the shafts 70a, 70b, the caps 74a, 74b move outwardly from the outer pressurization structure 62 thereby allowing the springs 52a, 52b to de-compress such that the sealant arrangement 32 is de-pressurized.

In certain embodiments, the multiple actuators 35a, 35b pressurize a contained sealant arrangement 32 and are configured such that multiple actuators 35a, 35b apply pressure to the same volume of sealant. It will be appreciated that the sealant arrangement 32 may include multiple portions of sealant, but the multiple portions are preferably in fluid communication with one another so as so form a collective single volume of sealant. In certain embodiments, the sealant can have a substantially incompressible construction such as gel capable of distributing the pressure applied by each actuator substantially throughout the entire volume of sealant of the sealant arrangement 32. Thus, the multiple actuators can additively contribute to the sealing force/pressure applied to a common volume of sealant.

It will be appreciated that a variety of different material types can be used to form the sealant arrangement 32. Example materials include elastomers, including natural or synthetic rubbers (e.g., EPDM rubber or silicone rubber). In other embodiments, polymeric foam (e.g., open cell or closed cell) such as silicone foam can be used. In still other embodiments, the sealing members may comprise gel and/or gel combined with another material such as an elastomer. The gel may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The sealing members can also include additives such as moisture scavengers, antioxidants, tackifiers, pigments and/or fungicides. In certain embodiments, sealing members in accordance with the principles of the present disclosure have ultimate elongations greater than 100 percent with substantially elastic deformation to an elongation of at least 100 percent. In other embodiments, sealing members in accordance with the principles of the present disclosure have ultimate elongations of at least 200 percent, or at least 500 percent, or at least 1000 percent. Ultimate elongation can be determined by the testing protocol set forth at ASTM D412.

In accordance with aspects of the disclosure, the actuation arrangement 31 includes an indicating arrangement by which a user may determine whether or not the sealant arrangement 32 has been sufficiently pressurized/actuated. In the example shown in FIGS. 1 and 3, the actuators 35a, 35b respectively include indicator arrangements 40a, 40b. Each indicator arrangement 40a, 40b includes one or more indicia printed, molded, or otherwise provided on the shafts 70a, 70b (e.g., on exterior surfaces thereof). Non-limiting examples of indicia include color, numbers, symbols, and text. A window 45a, 45b through which the indicia may be viewed by the user is defined in the handles 36a, 36b, respectively. As the actuator 35a, 35b is moved, the indicia visible through the window 45a, 45b changes from indicating an unpressurized state (i.e., a non-actuated state) to indicating a pressurized state (i.e., an actuated state) of the sealant arrangement 32.

In some implementations, the shaft 70a, 70b of each actuator 35a, 35b includes a first indicia region I1 over which indicia is printed. In certain implementations, the indicia region I1 is disposed on the shaft 70a, 70b out of alignment with the window 45a, 45b until the handle 36a, 36b is threaded far enough down the shaft 70a, 70b to pressurize the sealant arrangement 32 (see FIG. 3). At least a portion of the first indicia region I1 is visible through the window 45a, 45b when the sealant arrangement 32 is fully actuated. In one example implementation, the first indicia region I1 is fully visible through the window 45a, 45b when the sealant arrangement 32 is fully actuated.

In certain other implementations, the indicia region I1 is disposed on the shaft 70a, 70b in alignment with the window 45a, 45b and is sufficiently long so that at least a portion remains aligned with the window 45a, 45b until the handle 36a, 36b is threaded far enough down the shaft 70a, 70b to pressurize the sealant arrangement 32. In such implementations, the lack of indicia visible through the window 45a, 45b indicates that the sealant arrangement 32 is fully actuated.

In other implementations, the shaft 70a, 70b of each actuator 35a, 35b includes a first indicia region I1 and a second indicia region I2 that each have different indicia. In the example shown in FIG. 3, the second indicia region I2 is visible through the window 45a, 45b when the sealant arrangement 32 is not pressurized or is not adequately pressurized. As the actuator handles 36a, 36b are threaded onto the shafts 70a, 70b, the windows 45a, 45b move from aligning with the second indicia regions I2 to aligning with the first indicia regions I1. In certain implementations, the first indicia regions I1 are fully visible through the windows 45a, 45b when the sealant arrangements 32 are fully actuated. For example, the shafts 70a, 70b may be colored red at the second indicia regions I2 and green at the first indicia regions I1.

As long as the color red is visible through the window 45a, 45b, the user may quickly and easily determine that the handle 36a, 36b has not been sufficiently threaded to fully/adequately actuate the sealant arrangement 32. When the color green is visible through the window 45a, 45b, the user may quickly and easily determine that the handle 36a, 36b has been sufficiently threaded to fully/adequately actuate the sealant arrangement 32. During decompression, the user may determine when the sealant arrangement 32 is fully decompressed. For example, in one example implementation, only the color red will be visible through the window 45a, 45b when the sealant arrangement 32 is fully decompressed. Accordingly, the user will not attempt to move the sealant arrangement 32 out of the housing base before the sealant arrangement 32 has been fully decompressed. Since the handle 36a, 36b is threaded in place relative to the shaft 70a, 70b, the status indication provided by the indicator arrangement 40a, 40b will not change over time even if gel volume is lost causing the springs 52a, 52b to decompress. Thus, the indicator shows whether the sealing unit was properly actuated at the time of installation. Hence, in the event of a seal failure, it can readily be ascertained if the failure was possibly the result of technician error during installation of the sealing unit.

Figure 4:
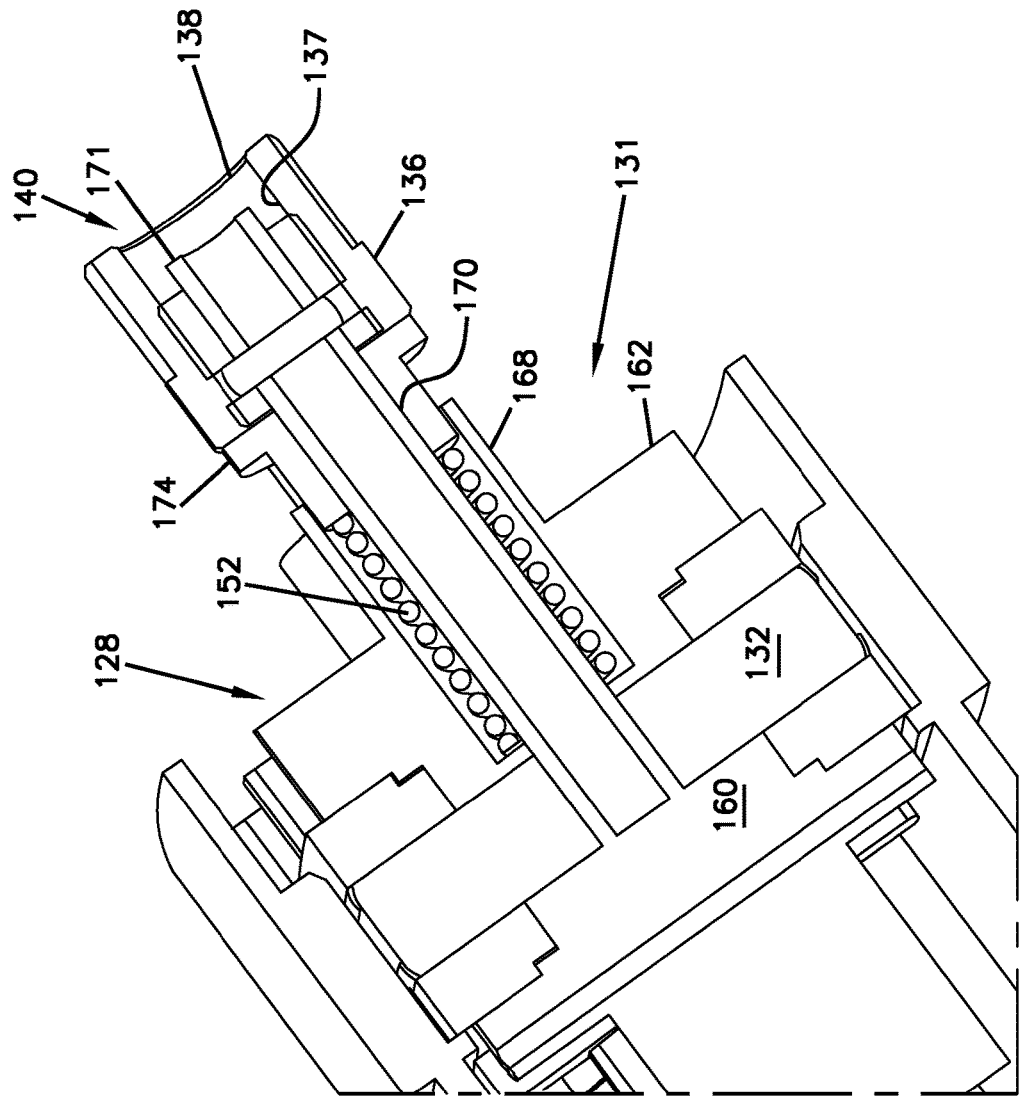
FIG. 4 is a cross-sectional view of another example actuator arrangement and indicator arrangement configured in accordance with the principles of the present disclosure.

FIG. 4 illustrates an alternate embodiment of an actuator arrangement 131, sealing unit 128, and actuation indicator arrangement 140 by which a user may determine if a sealant arrangement 132 has been sufficiently pressurized/actuated. The sealing unit 128 of FIG. 4 has the same construction as the sealing unit 28 described above, except that actuators 35a, 35b have been replaced with one or more actuators 135 and the indicator arrangement 40 has been replaced with the indicator arrangement 140. In some implementations, the actuation arrangement 131 includes two actuators 135 that are disposed along a major lateral axis of the sealing unit 128 similar to actuators 35a, 35b. In other implementations, however, the actuator 135 may be centrally mounted relative to the sealing unit 128.

Referring to FIG. 4, the depicted actuator 135 includes an internally threaded handle 136 and a cap 174. The actuator 135 also includes a spring 152 for transferring seal pressurization forces from the internally threaded handle 136 to the sealant arrangement 132. An outer pressurization structure 162 includes a spring sleeve 168 that receives the spring 152. The actuator 135 also includes a shaft 170 that extends through the spring 152. The shaft 170 has an inner end and an outer end. The inner end of the shaft 170 is connected to the inner pressurization structure 160. The internally threaded handle 136 is threaded on external threads of the shaft 170. By threading the handle 136 onto the shaft 170, the cap 174 is forced inwardly toward the outer pressurization structure 162 to compress the spring 152 and tension the shaft 170 and thereby cause the sealant arrangement 132 to be pressurized.

Actuation is indicated by interaction between the handle 136 and the shaft 170. The handle 136 defines an open top 138 that leads to an interior passage 137 of the handle 136. The shaft 170 extends along a length from the inner pressurization structure 160 to a distal end 171. The shaft 170 is sized so that the distal end 171 of the shaft 170 is disposed inside the interior 137 of the handle 136 when the sealant arrangement 132 is not pressurized. The actuator handle 136 is threaded onto a sleeve 137 affixed to the shaft 170 by a pin 139. The sleeve 137 has exterior threads that mate with interior threads of the actuator handle 136. As the actuator handle 136 is threaded onto the sleeve 137, the open top 138 of the handle 136 moves closer to the distal end 171 of the shaft 170. In certain implementations, the distal tip 171 of the shaft 170 aligns (e.g., is flush) with the open top 138 of the handle 136 when the sealant arrangement 132 is fully actuated.

As long as the tip 171 of the shaft 170 is not aligned with the top 138 of the handle 136, the user may quickly and easily determine that the handle 136 has not been sufficiently threaded to actuate the sealant arrangement 132. When the tip 171 of the shaft 170 is aligned with the top 138 of the handle 136, the user may quickly and easily determine that the handle 136 has been sufficiently threaded to actuate the sealant arrangement 132. Since the handle 136 is threaded in place relative to the shaft 170, the status indication provided by the indicator arrangement 140 will not change over time even if gel volume is lost causing the springs 152 to decompress.

Figure 5:
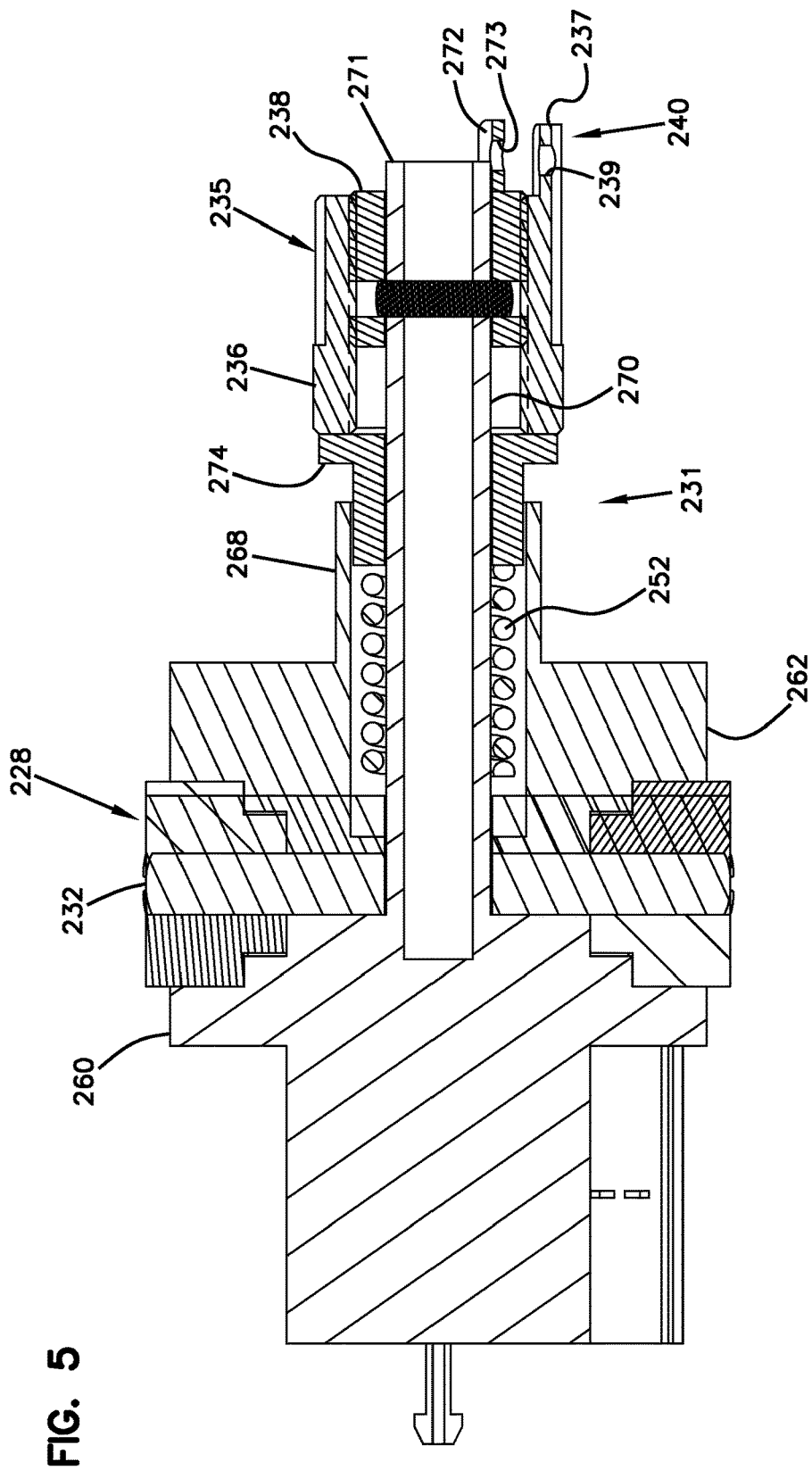
FIG. 5 is a cross-sectional view of another example actuator arrangement and indicator arrangement configured in accordance with the principles of the present disclosure.

FIG. 5 illustrates an alternate embodiment of an actuator arrangement 231, sealing unit 228, and actuation indicator arrangement 240 by which a user may determine that a sealant arrangement 232 is sufficiently pressured. The sealing unit 228 of FIG. 5 has the same construction as the sealing unit 128 described above with respect to FIG. 4, except that actuator 135 has been replaced with actuator 235 and indicator arrangement 140 has been replaced with indicator arrangement 240.

The actuator 235 includes an internally threaded handle 236 and a cap 274. The actuator 235 also includes a spring 252 for transferring seal pressurization forces from the internally threaded handle 236 to the sealant arrangement 232. An outer pressurization structure 262 includes a spring sleeve 268 that receives the spring 252. The actuator 235 also includes a shaft 270 that extends through the spring 252. The shaft 270 has an inner end and an outer end. The inner end of the shaft 270 is connected to the inner pressurization structure 260. The internally threaded handle 236 is threaded on external threads defined by a sleeve 269 pinned to the shaft 270. By threading the handle 236 onto the shaft 270 (i.e., onto the sleeve 269), the cap 274 is forced inwardly toward the outer pressurization structure 262 to compress the spring 252 and tension the shaft 270 and thereby cause the sealant arrangement 232 to be pressurized.

Actuation is indicated by interaction between the handle 236 and the shaft 270. The handle 236 includes a flange 237 that extends outwardly from the handle 136 away from the sealing arrangement 232. The flange 237 of the handle 236 defines an opening 239 that extends generally transversely to a movement axis of the cap 74. The handle 236 also defines an open top 238. The shaft 270 extends from the inner pressurization structure 260 to a distal end 271. A flange 272 extends outwardly from the distal end 271 of the shaft 270. The flange 272 defines an opening 273 that extends generally parallel with the opening 239 defined in the handle flange 237.

The shaft 270 is sized so that the opening 273 defined in the shaft flange 272 does not align with the opening 239 defined in the handle flange 237 when the sealant arrangement 132 is not pressurized. In certain implementations, the distal end 271 of the shaft 270 may be located within the handle 236 when the sealant arrangement 132 is not pressurized. As the actuator handle 236 is threaded onto the shaft 270, the flange 237 of the handle 236 moves closer to the flange 272 of the shaft 270. Threading of the handle 236 also brings the flange 237 into rotational alignment with the flange 272 of the shaft 270. In certain implementations, the opening 273 defined in the shaft flange 272 aligns with the opening 239 defined in the handle flange 237 when the sealant arrangement 232 is fully actuated.

As long as the opening 273 of the shaft flange 272 is not aligned with the opening 239 of the handle flange 237, the user may quickly and easily determine that the handle 236 has not been sufficiently threaded to actuate the sealant arrangement 232. When the opening 273 of the shaft flange 272 is aligned with the opening 239 of the handle flange 237, the user may quickly and easily determine that the handle 236 has been sufficiently threaded to actuate the sealant arrangement 232. Since the handle 236 is threaded in place relative to the shaft 270, the status indication provided by the indicator arrangement 240 will not change over time even if gel volume is lost causing the springs 252 to decompress. Thus, the indicator provides an indication of the level of actuation of the actuation arrangement of initial installation of the sealing unit. In this way, the indicator provides a means for determining, at a time after initial installation, whether or not the sealing unit was properly actuated at the time of initial installation.

FIGS. 6-19 show another sealing unit 428 in accordance with the principles of the present disclosure. Similar to previous embodiments, the sealing unit 428 is adapted to be installed in an opening of an enclosure. The sealing unit 428 defines ports 430 which receive cables that are routed into the enclosure through the enclosure opening. When pressurized, the sealing unit 428 provides seals around the cables in the ports 430 such that moisture is prevented from entering the enclosure through the ports 430. When pressurized, the sealing unit 428 also can seal the opening of the enclosure by forming a seal with the enclosure that extends around the periphery of the sealing unit 428. By way of example, the peripheral seal is formed where a peripheral portion of the sealant of the sealing unit presses against a portion of the enclosure that defines the enclosure opening.

Figure 6:
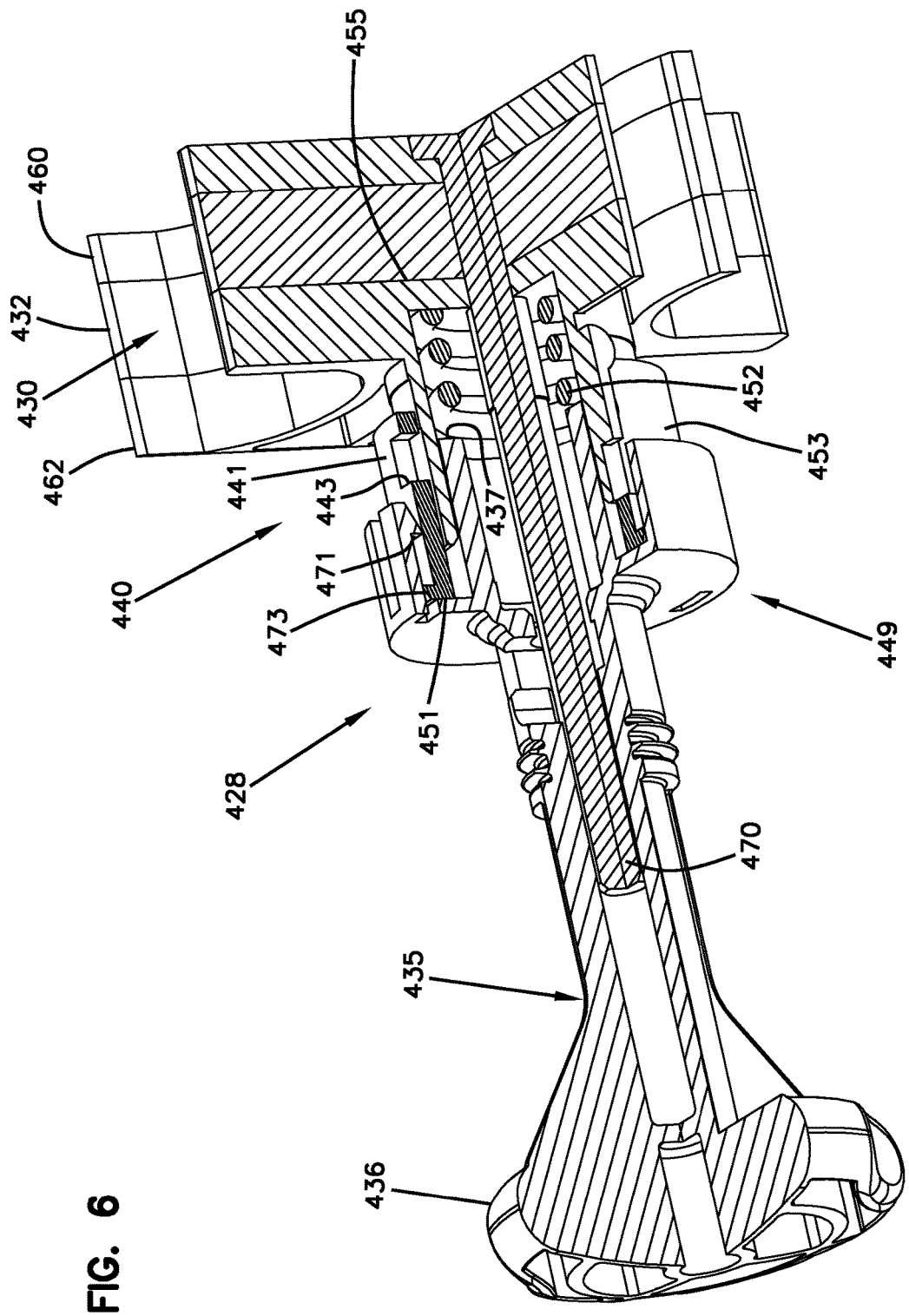
FIG. 6 is a cross-sectional view of another sealing unit in accordance with the principles of the present disclosure, the sealing unit is shown in a non-actuated state.

Referring to FIG. 6, the sealing unit 428 includes a volume of sealant 432 positioned between inner and outer pressurization structures 460, 462. An actuator shaft 470 is coupled to the outer pressurization structure 462 and extends through the inner pressurization structure 460. An actuator spring 452 is mounted over the actuator shaft 470. The actuator spring 452 is coaxially aligned with the actuator shaft 470 and fits within a first sleeve 453 (i.e., a first indicator structure) carried with the outer pressurization structure 462. As depicted, the first sleeve 453 has an inner end that is coupled to (e.g., integrally formed with) a main body of the outer pressurization structure 462. An inner end of the first sleeve 453 is at least partially blocked by a wall 455 of the outer pressurization structure 452. The wall 455 prevents the actuator spring 452 from passing through the outer pressurization structure 462. In use, an actuation load from the actuation spring 452 is applied to the outer pressurization structure 462 through the wall 455 (e.g., the spring 452 abuts against the wall 455 to apply a spring load to the wall 455 and to the remainder to the outer pressurization structure 462 coupled to the wall 455.

The sealing unit 428 further includes an actuation member 435 having an actuator handle 436. The actuator handle 436 is at an outer end of the actuator member 435. An inner end 437 of the actuator member 435 fits within the first sleeve 453. The actuator member 435 includes internal threads that mate with external threads of the actuator shaft 470 such that the actuator member 435 is threaded on the actuator shaft 470. The sealing unit 428 is actuated by grasping the actuator handle 436 and turning the actuator member 435 in a first rotational direction about the actuator shaft 470 such that the threads cause the actuator member 435 to move axially along the actuator shaft 470 in a direction toward the outer pressurization structure 462. As the actuator member 435 moves toward the outer pressurization 462, the inner end 437 of the actuator member 435 engages an outer end of the actuator spring 452 and compresses the actuator spring 452 against the wall 455 of the outer pressurization structure 462. As spring load is applied to wall 455 by the actuator spring 452, the inner and outer pressurization structures for 460, 462 are forced (i.e., urged) together and the actuator shaft 470 is tensioned. As the inner and outer pressurization structures 460, 462 are forced together, the sealant 432 flows to fill any voids between the inner and outer pressurization structures 460, 462 thereby forming seals around any cables routed through the ports 430. Additionally, the sealant 432, which is contained about its periphery by a wall of the enclosure that defines the opening in which the sealing unit 428 is mounted, is also pressed against the wall of the enclosure thereby forming a peripheral seal around the sealing unit 428. The spring force provided by the actuator spring 452 maintains constant spring pressure on the sealant 432 such that the seals at the ports 430 and the peripheral seal are maintained over time. It will be appreciated that in certain examples, the spring pressure applied to the sealant 432 can cause sealant shrinkage over time. For example, for certain gels used as sealant material, the application of spring pressure to the gel will cause oil to bleed from the gel over time thereby causing a gradual reduction in sealant volume. When this occurs, the outer pressurization structure 462 moves toward the inner pressurization structure 462 account for the shrinkage.

Referring back to FIG. 6, the sealing unit 428 also includes an actuation level indicator 440. The actuation level indicator 440 includes a second sleeve 441 (i.e., a second indicator structure) that mounts over the first sleeve 453. The second sleeve 441 includes a window 443 for viewing actuation level indicia provided (e.g., printed, embossed, marked, embedded, etc.) at the outer surface of the first sleeve 453. In one example, the actuation level indicia can include a first indicium 445 (e.g., a color such as red, a pattern, a number, a symbol, etc.) indicative of a non-actuated actuation level and a second indicium 447 (e.g., a color such as green, a pattern, a number, a symbol, etc.) indicative of a fully actuated actuation level. The actuation member 435 includes a collar 449 that fits over an outer end of the second sleeve 441. The collar 449 includes an outer stop 451 and an inner stop 471. The second sleeve 441 includes a flange 473 at its outer end that is captured between the outer and inner stops 451, 471 of the collar 449.

The second indicium 447 is positioned between the first indicium 445 and the outer pressurization structure 462.

Figure 7:
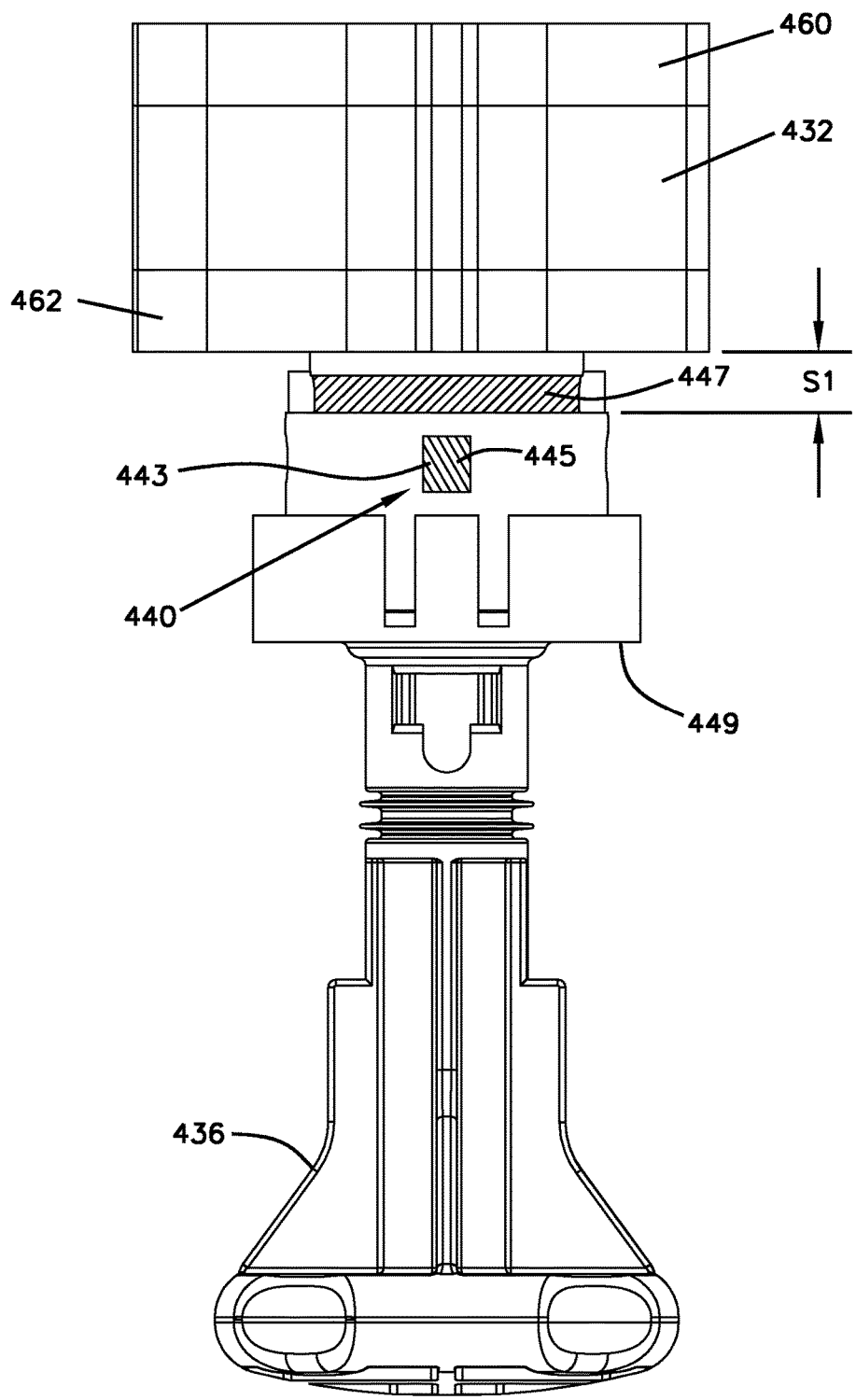
FIG. 7 is a top view of the sealing unit of FIG. 6 shown in the non-actuated state of FIG. 6.

FIGS. 6 and 7 show the sealing unit 428 with the actuator in a non-actuated position (i.e., state). In the non-actuated position, the inner end 437 of the actuator member 435 is offset from the actuator spring 452 and the flange 473 of the second sleeve 441 is positioned adjacent the outer stop 451 of the collar 449. The outer end of the second sleeve 441 is shown abutting the outer stop 451 of the collar 449. Additionally, as shown in FIG. 7, the inner end of the second sleeve 441 is offset from the outer pressurization structure 462 by a spacing S1. Moreover, the window 443 of the second sleeve 441 aligns with the first indicium 445 such that only the first indicium is visible through the window 443. The presence of the first indicium 445 at the window 443 indicates that the actuator of the sealing unit 428 is at a non-actuated level. It will be appreciated that the size of the spacing S1 can also be used to provide an indication of the level of actuation of the actuator.

Figure 8:
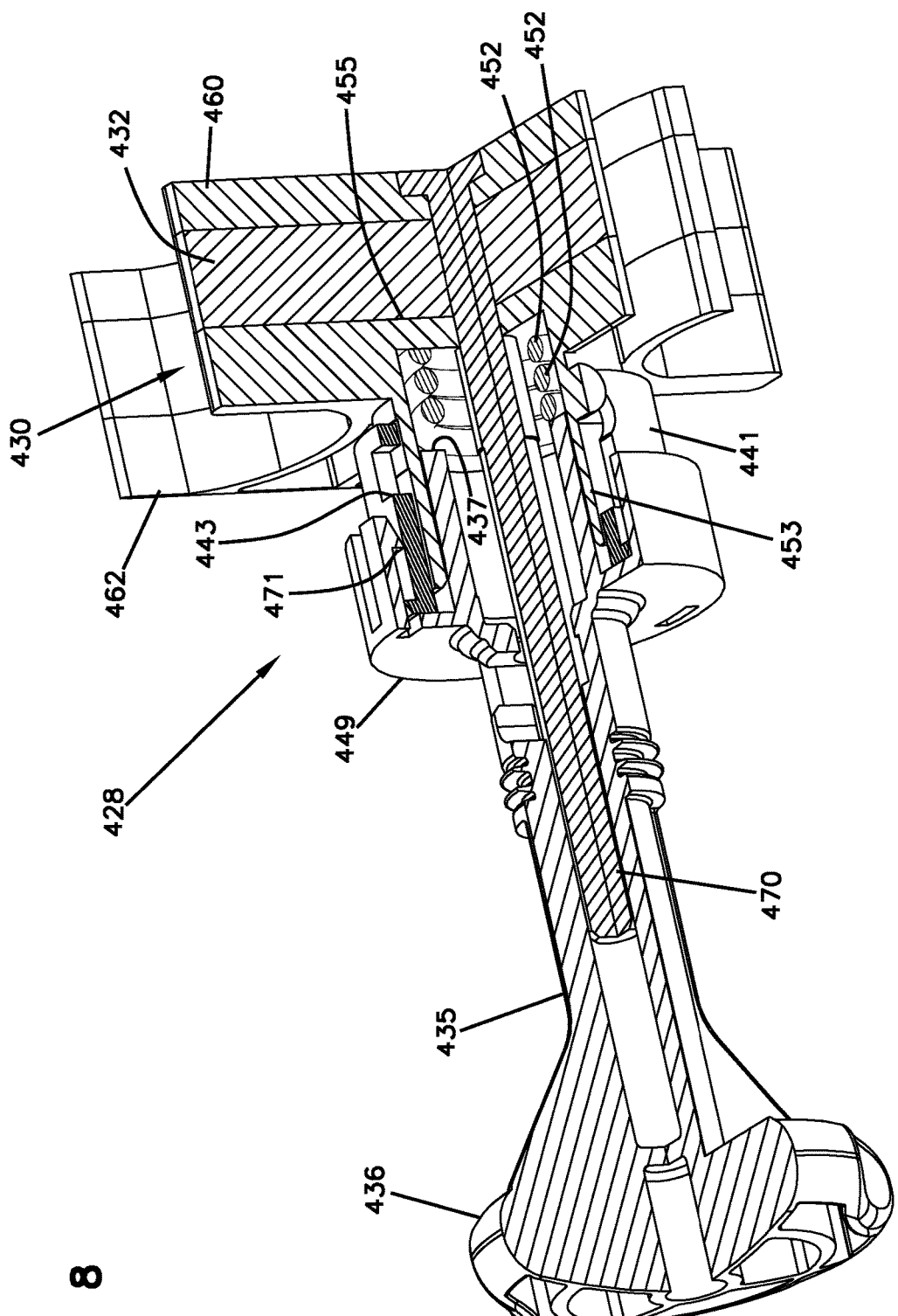
FIG. 8 is a cross-sectional view of the sealing unit of FIG. 6 shown in a partially actuated state.
Figure 9:
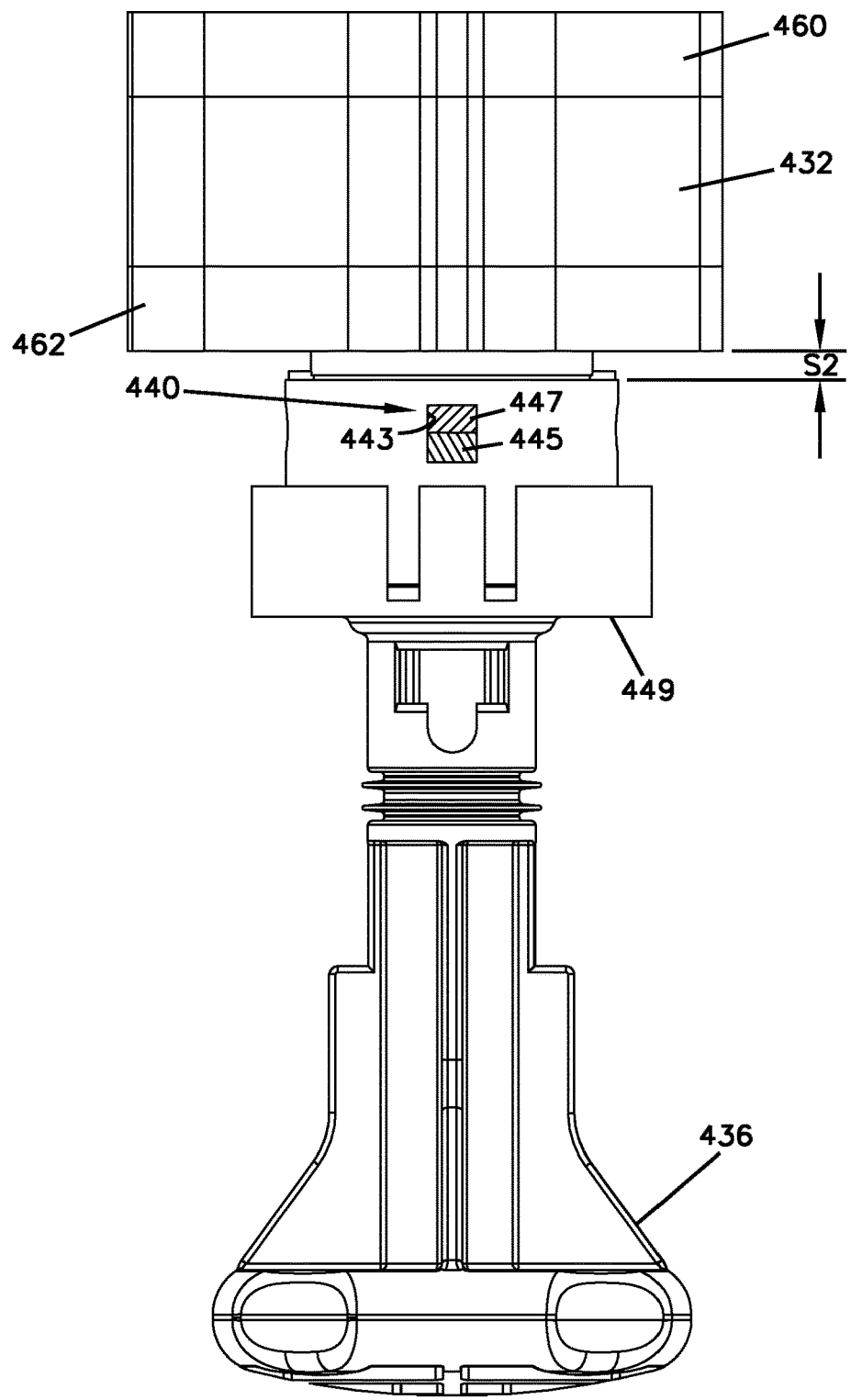
FIG. 9 is a top view of the sealing unit of FIG. 6 in the partially actuated state of FIG. 8.

To actuate the actuator, the actuator handle 436 is manually turned in the first rotational direction about the actuator shaft 470 causing the actuator member 435 to thread axially toward the outer pressurization structure 462. FIGS. 8 and 9 show the sealing unit 428 after the actuator has been actuated to a partial actuation level (i.e., a partially actuated state/position). As shown at FIGS. 8 and 9, the actuator member 435 has moved axially toward the outer pressurization structure 462 and the inner end 437 of the actuator member 435 has engaged the actuator spring 452 such that the actuator spring 452 is compressed. Additionally, as the actuator member 435 is moved from position of FIG. 6 to the position of FIG. 8, contact between the outer stop 451 of the collar 449 and the outer end of the second sleeve 441 causes the second sleeve 441 to slide on the first sleeve 453 in a direction toward the outer pressurization structure 462. For example, the second sleeve 441 is at an intermediate position where a portion of the first indicium 445 and a portion of the second indicium 447 are both visible through the window 443. Thus, the actuation level indicator 440 provides an indication that the actuator has been actuated to an intermediate level. In the intermediate position, the inner end of the second sleeve 441 is separated from the outer pressurization structure 462 by a spacing S2.

Figure 10:
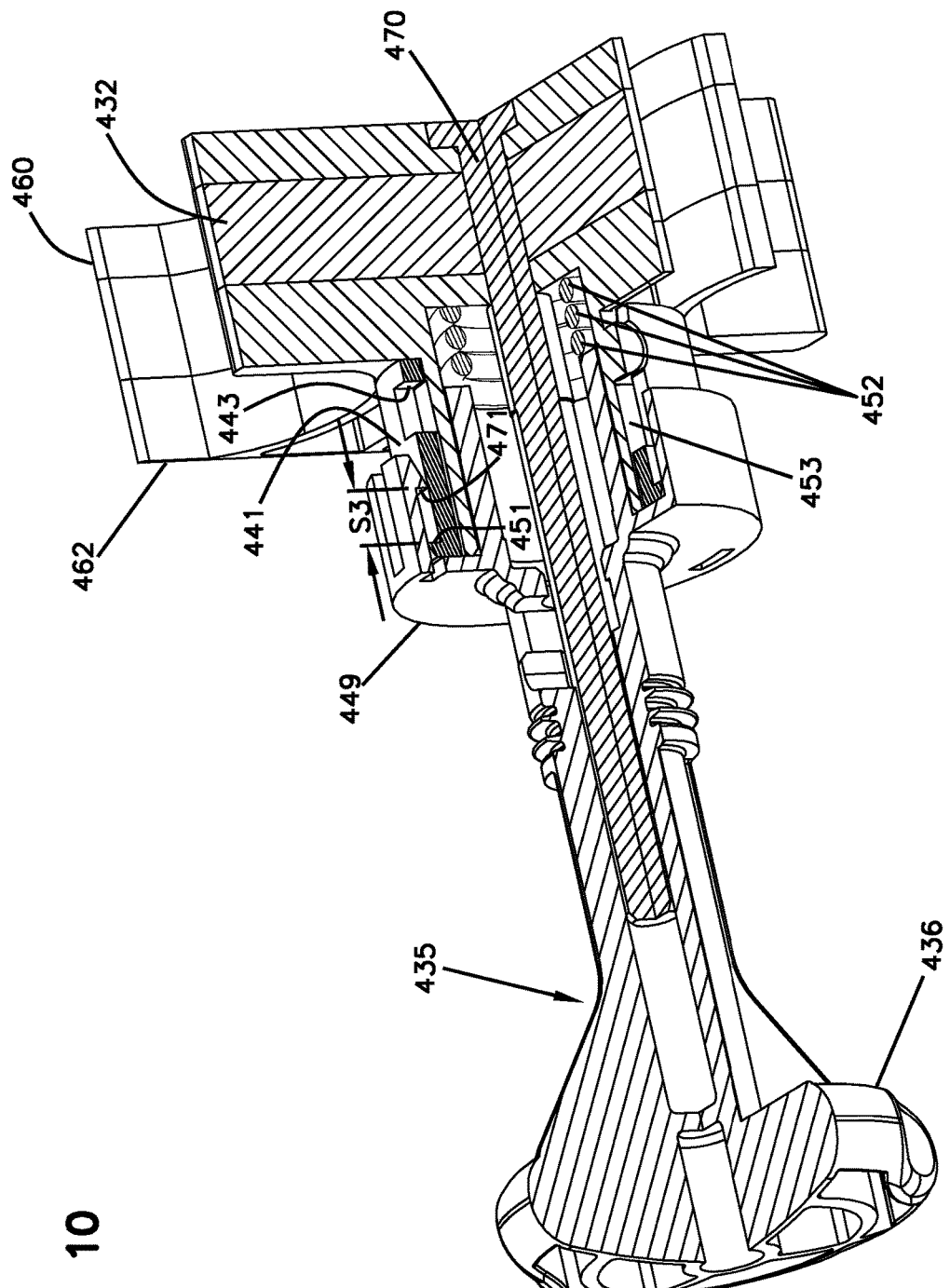
FIG. 10 is a cross-sectional view of the sealing unit of FIG. 6 shown in a fully actuated state.
Figure 11:
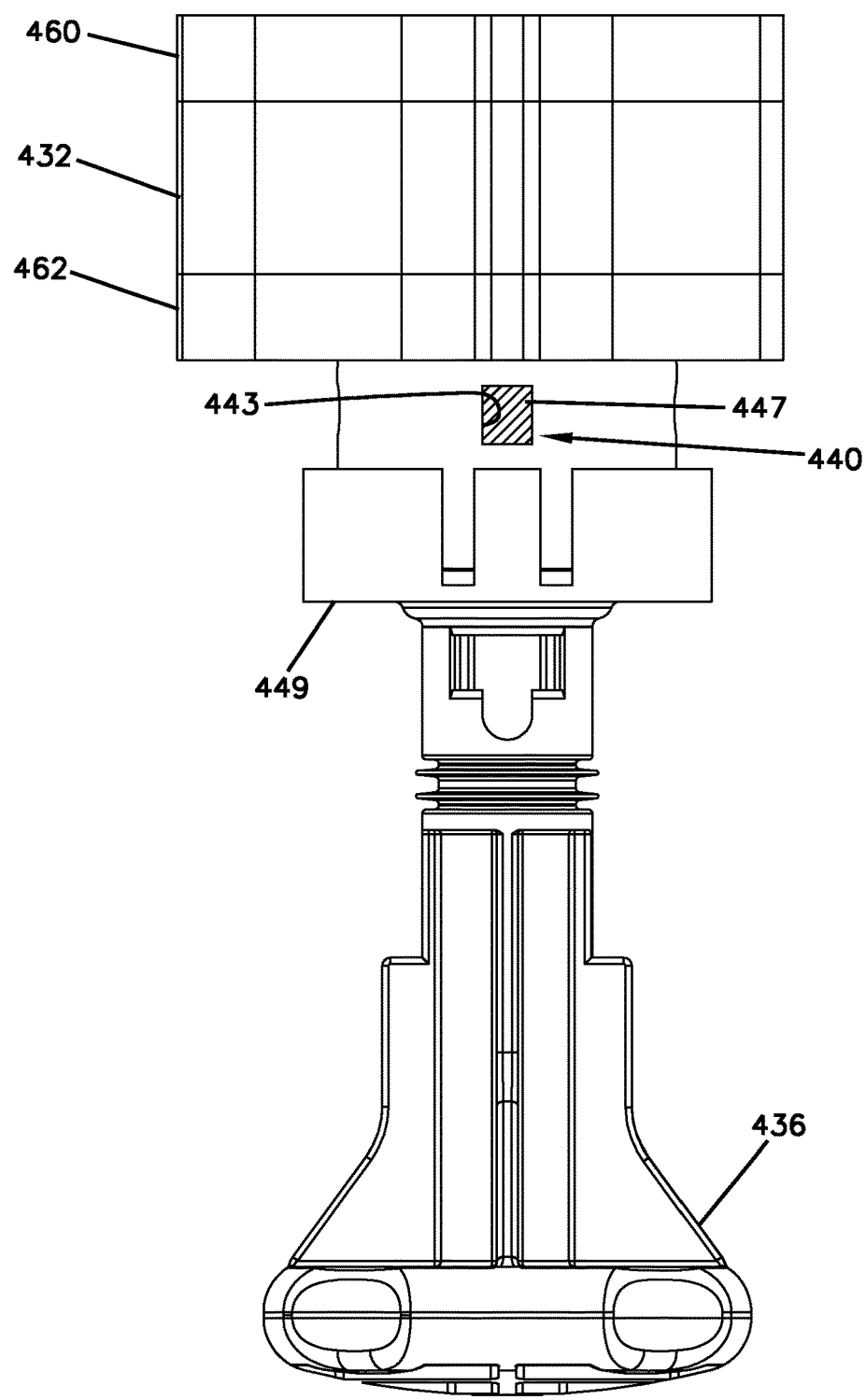
FIG. 11 is a top view of the sealing unit of FIG. 6 in the fully actuated state of FIG. 10.

To fully actuate the actuator of the sealing unit 428, the actuator member 435 is further turned in the first rotational direction about the actuator shaft 470 causing the actuator member 435 to move toward the outer pressurization structure 462 to a fully actuated position as shown at FIGS. 10 and 11. As shown at FIGS. 10 and 11, the actuation spring 452 is more completely compressed between the inner end 437 of actuator member 435 and the wall 455 of the outer pressurization structure 462. Additionally, the second sleeve 441 has been pushed by the outer stop 451 of the collar 449 to a position where the inner end of the second sleeve 441 engages/abuts the outer pressurization structure 462. In this position, the window 443 of the second sleeve 441 aligns with the second indicium 447 and thereby provides an indication that the actuator has been fully actuated.

Referring still to FIGS. 10 and 11, a spacing S3 is defined between the outer stop 451 and inner stop 471 of the collar 449. The spacing S3 allows for a limited range of movement between the second sleeve 441 and the actuator member 435 to accommodate movement of the outer pressurization structure 462 as a result of shrinkage of the sealant 432. It will be appreciated that absent a positive axial force being applied to the second sleeve 441, the second sleeve 441 will not move relative to the first sleeve 453. For example, friction between the second sleeve 441 and the first sleeve 453 can be used to resist relative movement between the first sleeve 453 and the second sleeve 441. In other examples, a latch, catch, detent, or other structure can be provided between the first and second sleeves 453, 441 to prevent unintended movement of the second sleeve 441 relative to the first sleeve 453.

Figure 12:
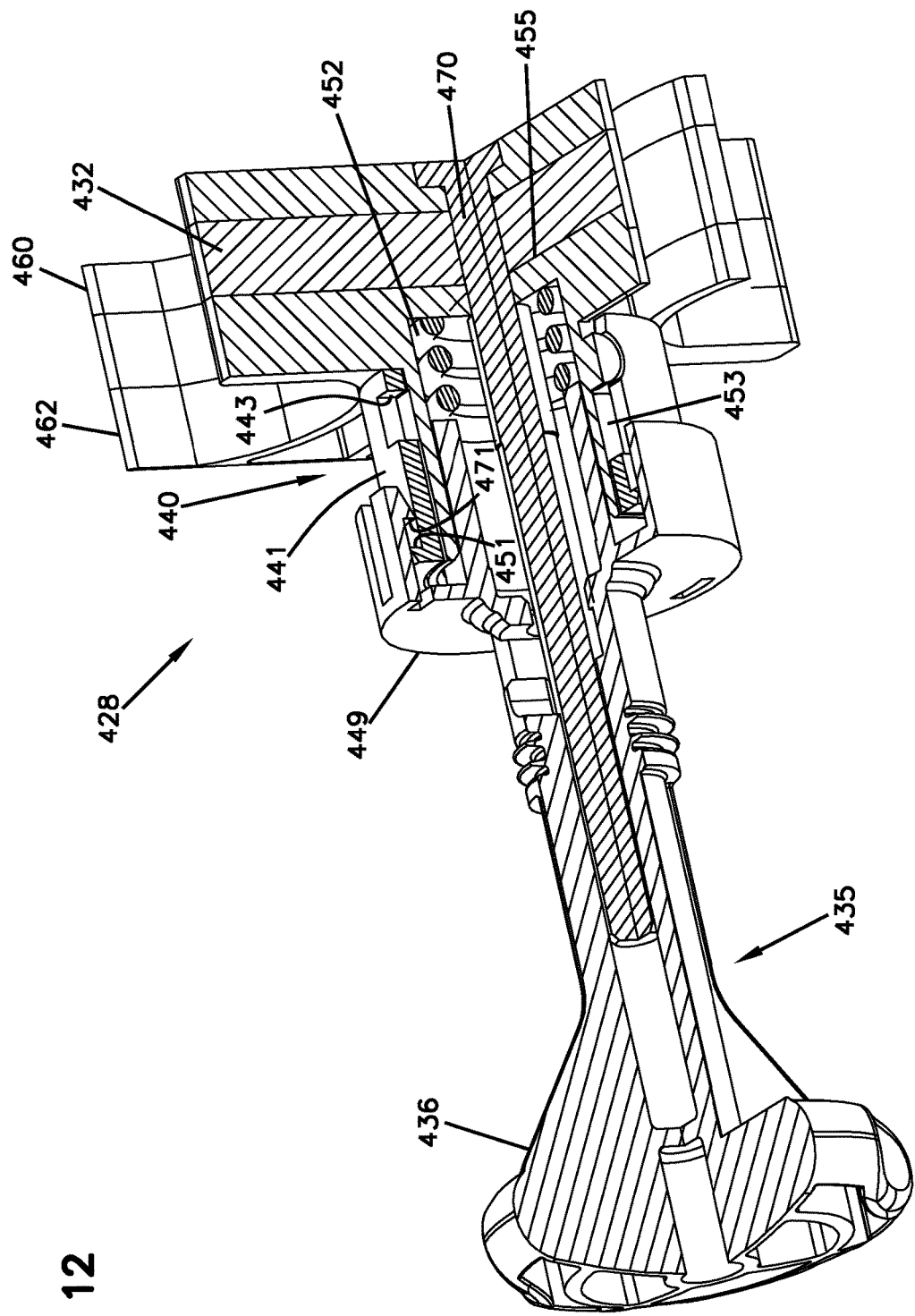
FIG. 12 is a cross-sectional view of the sealing unit of FIG. 6 in a state where sealant has shrunk over time and an actuation level indicator of the sealing unit has accommodated the sealant shrinkage without changing the actuation level reading provided by the actuation level indicator.
Figure 13:
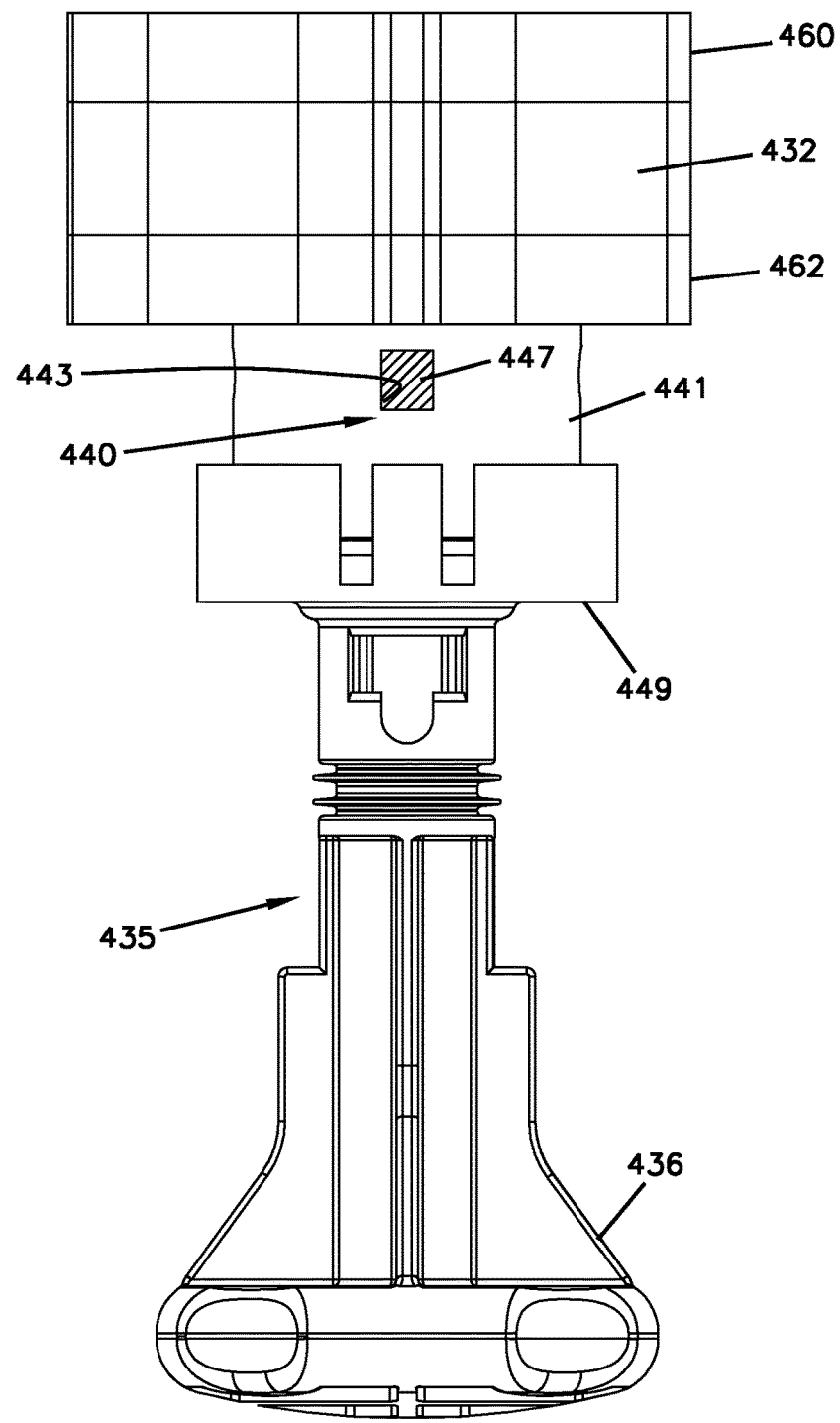
FIG. 13 is a top view of the sealing unit of FIG. 6 in the state of FIG. 12.
Figure 14:
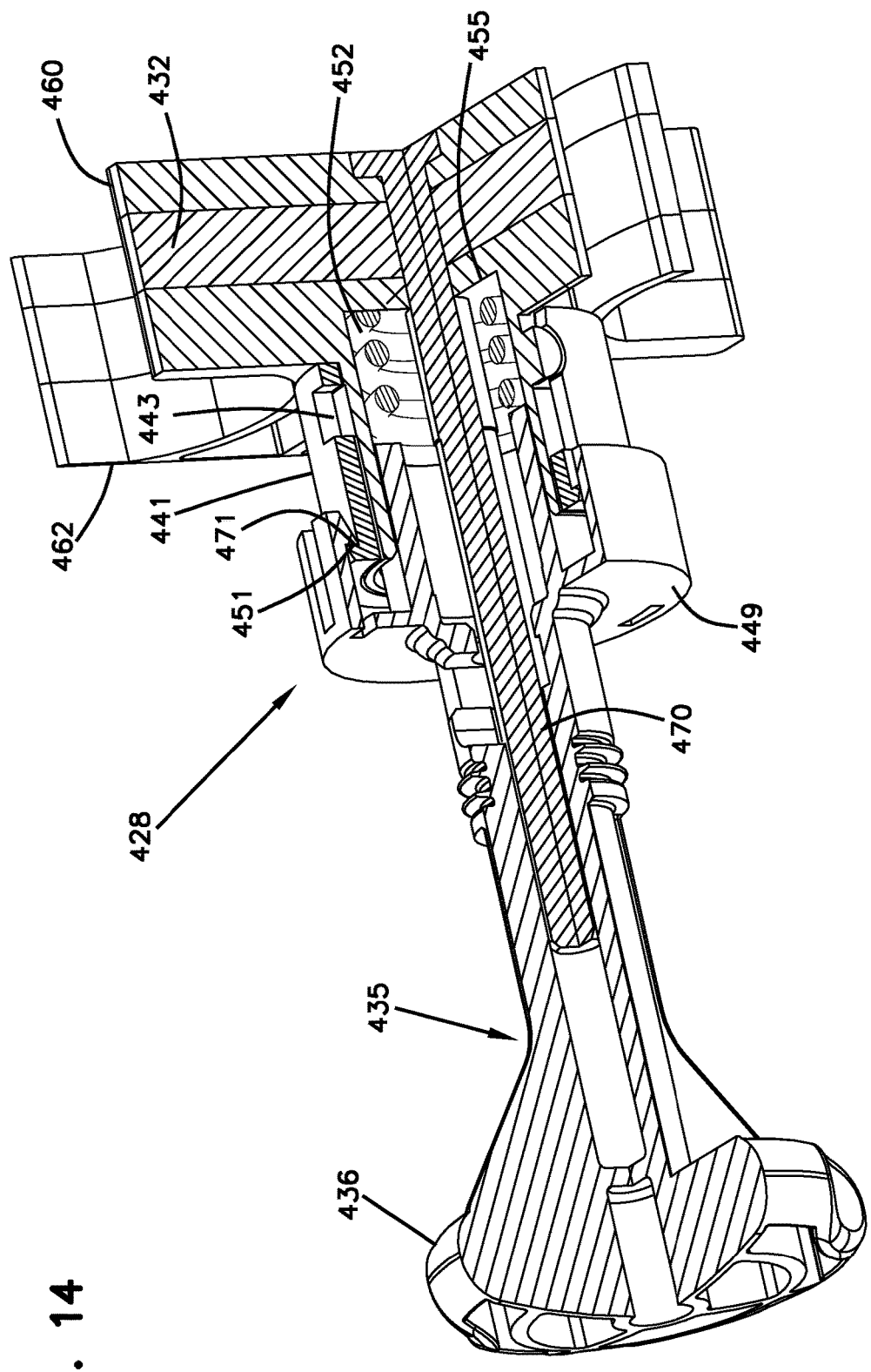
FIG. 14 is a cross-sectional view of the sealing unit of FIG. 6 in the initial process of being de-actuated.
Figure 15:
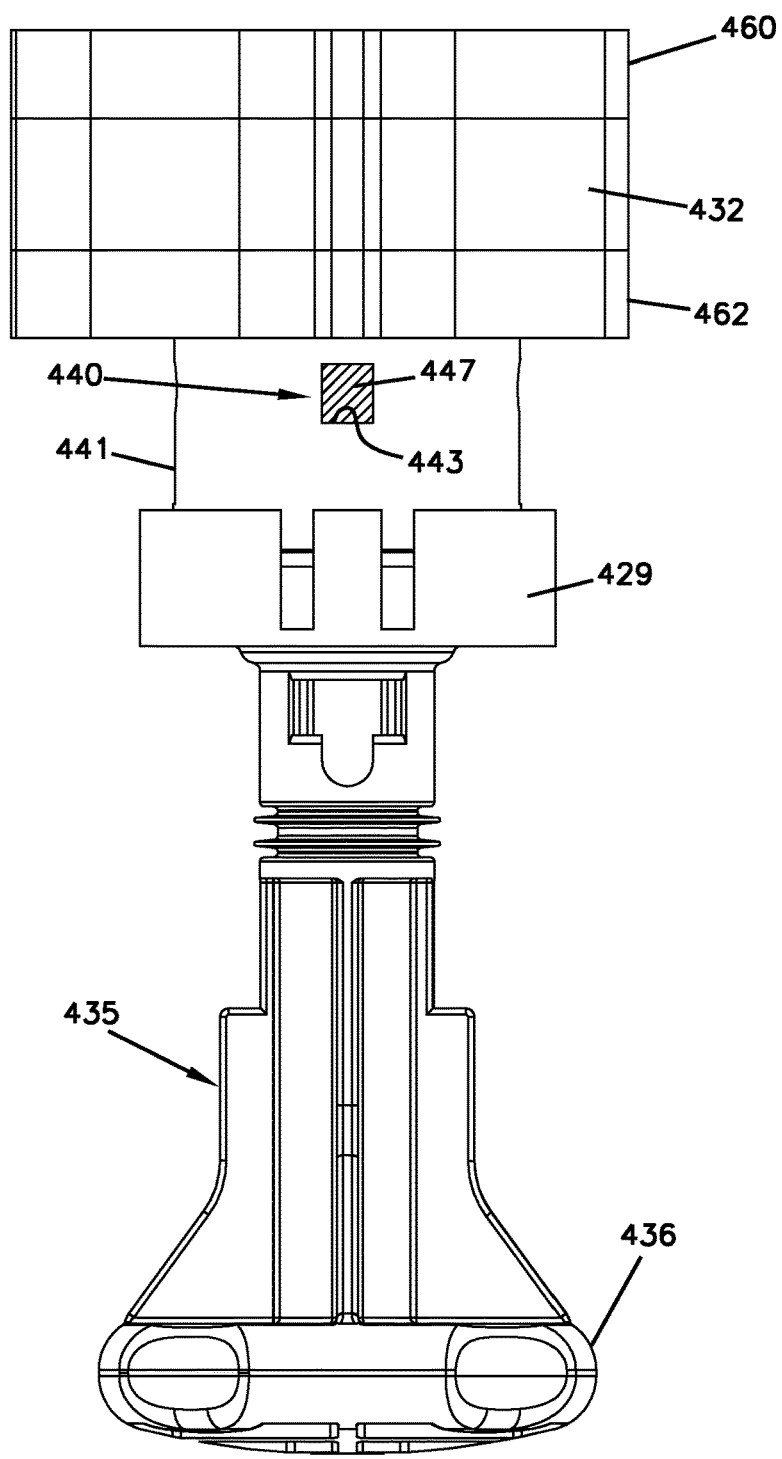
FIG. 15 is a top view of the sealing unit of FIG. 6 in the state of FIG. 14.

When the volume of sealant 432 is reduced over time due to shrinkage, the actuation spring 452 causes the outer pressurization structure 462 to move axially toward the inner pressurization structure 460. When this occurs, the second sleeve 441 is carried with the first sleeve 453 as the outer pressurization structure 462 moves toward the inner pressurization structure 460. In this way, movement of the outer pressurization structure 462 due to sealant shrinkage is accommodated without changing the reading of the actuation level indicator 440. For example, as shown at FIGS. 12 and 13, the outer pressurization structure 462 has moved in a forward direction relative to the actuator member 435 due to sealant shrinkage. As the outer pressurization structure 462 and its corresponding first sleeve 453 move to accommodate the sealant shrinkage, the second sleeve 441 moves in concert with the first sleeve 453 (i.e., the second sleeve 441 is carried by the first sleeve 453) such that the second sleeve 441 moves relative to the actuator member 435 and the actuator shaft 470. The range of relative movement between the second sleeve 441 and the actuator member 453 is limited by the spacing S3 between the outer and inner stops 451, 471 of the collar 449. By way of example, the spacing S3 is substantially less than the total range of movement of the actuator member relative to the shaft and can be in the range of 5-10 millimeters, or about 7 millimeters. However, it will be appreciated that the spacing S3 is dependent upon the amount the sealant 432 is anticipated to shrink and can vary from example to example.

Because the second sleeve 441 moves with the first sleeve 453 and the outer pressurization structure 462 when the sealant 432 shrinks, the reading provided by the actuation level indicator 440 does not change as the sealant loses volume. For example, as shown at FIG. 13, the actuation level indicator 440 continues to display the second indicium 447 which is indicative of the actuator being fully actuated. In this way, the actuator level indicator 440 provides a means for indicating the level of actuation provided to the sealing unit 428 at the time of installation irrespective of sealant shrinkage 432. This information can be used to determine whether or not the actuator was fully actuated at the time of initial installation. Such information can assist in determining whether a seal failure was the result of operator error or other causes.

Figure 16:
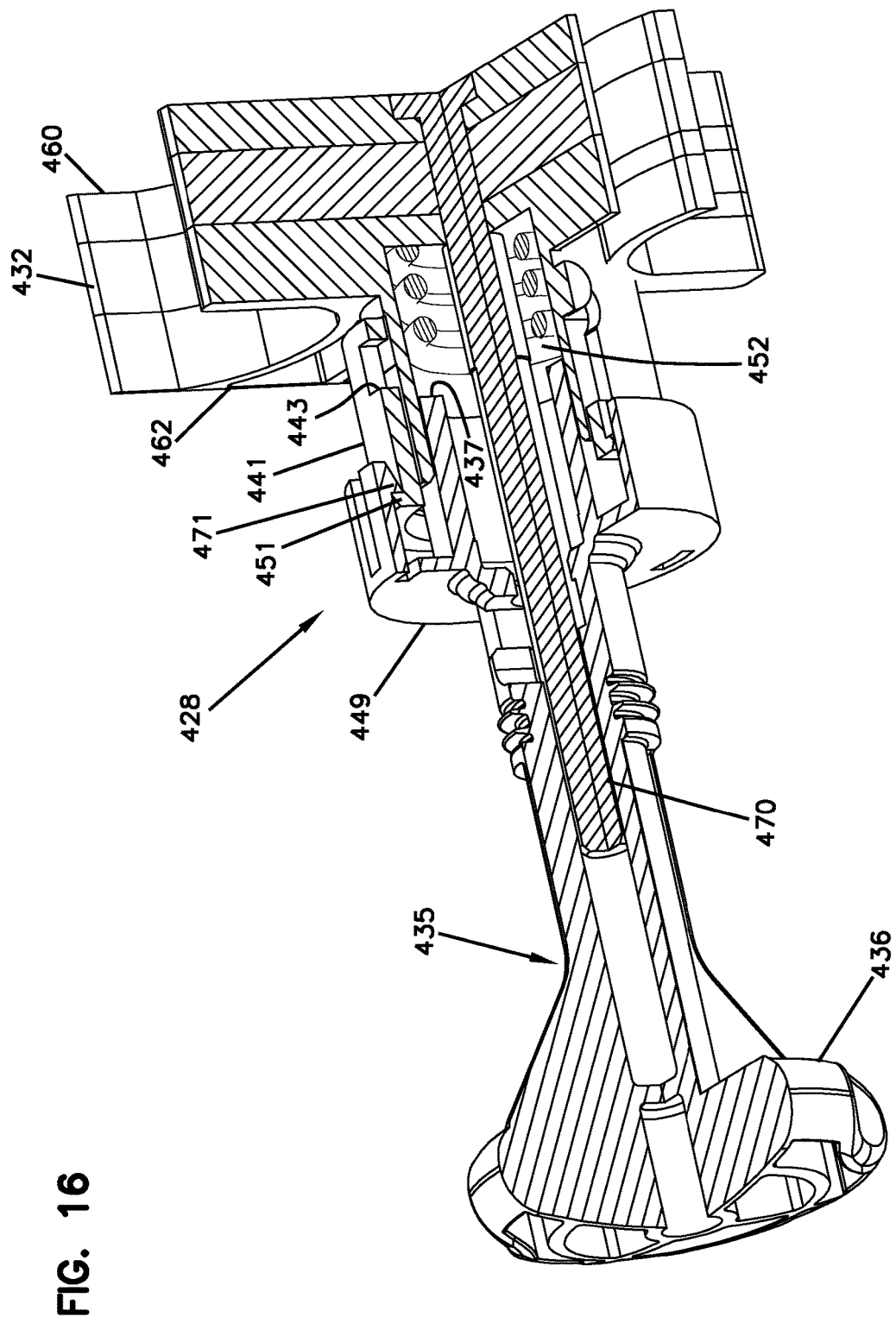
FIG. 16 is a cross-sectional view of the sealing unit of FIG. 6 in a partially de-actuated state.
Figure 17:
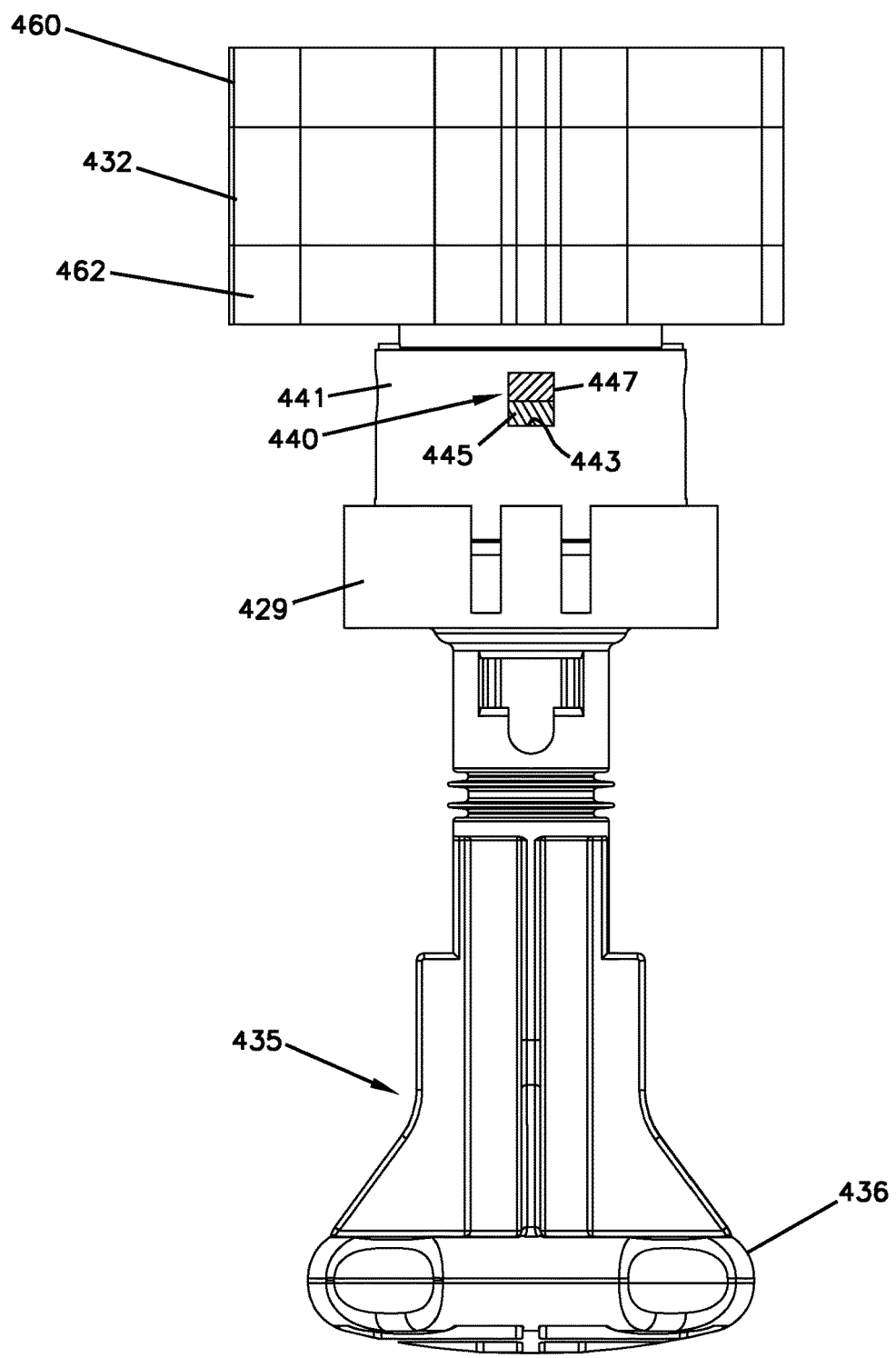
FIG. 17 is a top view of the sealing unit of FIG. 6 in the partially de-actuated state of FIG. 16.

To de-actuate the actuator, the actuator member 435 is turned in a second rotational direction (i.e., a direction opposite from the first rotational direction) about the actuator shaft 470 causing the actuator member 435 to unthread from the actuator shaft 470 and to move axially away from the outer pressurization structure 462, thereby de-pressurizing the spring 452. The actuation member 435 moves relative to the second sleeve 441 until the inner stop 471 of the collar 449 engages the flange 473 of the second sleeve 441 as shown at FIGS. 16 and 17. Thus, for a limited range of movement, the spring 452 is being de-pressurized while the reading in the window 443 remains unchanged. Thereafter, continued rotation of the actuator member 435 in the second rotational direction causes the actuator member 435 to pull the second sleeve 441 outwardly relative to the first sleeve 453 (via contact between the flange 473 and the inner stop 471) through an intermediate position (see FIGS. 16 and 17) back to a non-actuated position where only the first indicium 445 is visible through the window 443. It will be appreciated that the spring 452 may be fully de-compressed before the non-actuated indicium is fully visible. With the non-actuated indicium visible, the operator is assured that the sealing unit can safely be removed from the opening in the enclosure.

As used herein, the phrase "fully actuated" means sufficiently actuated to cause the sealing unit to perform its desired sealing function. It will be appreciated that the first sleeve 453 is an example of a first indicator structure that always moves with a component of the pressurization arrangement (e.g., is always carried with the outer pressurization structure 462). It will be appreciated that the second sleeve 441 is an example of a second indicator structure that moves relative to the first indicator structure during actuation of the sealing unit, and that is carried with the first indicator structure after actuation to allow for sealant shrinkage over time without altering the actuation level indication provided by the actuation level indicator. It will be appreciated that the first and second indicator structures can have shapes other than sleeves. It will further be appreciated that the term "window" means any structure through which something can be viewed.

The above specification, examples and data provide a complete description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES 20 enclosure
22 housing
24 end
26 sealing unit opening
28 sealing unit
30 main cable ports
31 actuation arrangement
32 sealant arrangement
32a, 32b, 32c sealant portions
33 port diameter reducers
35a, 35b actuators
36a, 36b internally threaded handles
37 reduced-size cable ports
40a, 40b indicator arrangement
45a, 45b window
52a, 52b springs
60 inner pressurization structure
62 outer pressurization structure
66a, 66b parallel axes
68a, 68b spring sleeves
70a, 70b shafts
74a, 74b caps
90 frame
91 fiber optic components
I1, I2 indicia regions
128 sealing unit
131 actuation arrangement
132 sealant arrangement
135 actuator
136 handle
137 interior
138 open top
140 indicator arrangement
152 spring
160 inner pressurization structure
162 outer pressurization structure
168 spring sleeve
170 shaft
171 distal end of shaft
174 cap
228 sealing unit
231 actuation arrangement
232 sealant arrangement
235 actuator
236 handle
237 flange
238 open top
239 opening
240 indicator arrangement
252 spring
260 inner pressurization structure
262 outer pressurization structure
268 spring sleeve
270 shaft
271 distal end of shaft
272 flange
273 opening
274 cap
428 sealing unit
430 ports
432 sealant
435 actuation member
436 actuator handle
437 inner end
440 an actuation level indicator
441 a second sleeve
443 window
445 first indicium
447 second indicium
449 a collar
451 outer stop
452 an actuator spring
453 first sleeve
455 wall
460 inner pressurization structure
462 outer pressurization structure
470 actuator shaft
471 inner stop
473 flange
S1 first spacing
S2 second spacing
S3 third spacing

What is claimed is:

1. A sealing unit comprising:
a sealant defining at least one cable port;
a pressurization arrangement for pressurizing the sealant, the pressurization arrangement including a spring and an actuator for causing the spring to apply spring pressure to the sealant; and
an actuation level indicator including a first indicator structure that moves with a pressurization component of the pressurization arrangement, the pressurization component being configured to move in response to shrinkage of the sealant over time, the actuation level indicator also including a second indicator structure that moves relative to the first indicator structure during actuation of the pressurization arrangement, and wherein the second indicator structure is also configured to move with the first indicator structure when the pressurization component moves in response to shrinkage of the sealant over time such that no relative movement occurs between the first and second indicator structures in response to shrinkage of the sealant over time.

2. The sealing unit of claim 1, wherein the pressurization structure is a pressure plate that at least partially contains the sealant.

3. The sealing unit of claim 1, wherein the first indicator structure includes an indicium indicative of an actuation level of the actuator, and wherein the second indicator structure covers or exposes the indicium as the pressurization arrangement is actuated.

4. The sealing unit of claim 3, wherein the second indicator structure includes a window through which the indicium can be viewed.

5. The sealing unit of claim 4, wherein the indicium includes a first indicium representative of a non-actuated level and a second indicium representative of a fully actuated level, wherein the first indicium is visible through the window when the pressurization arrangement is in a non-actuated state, and wherein the second indicium is visible through the window when the pressurization arrangement is in a fully actuated state.

6. The sealing unit of claim 3, wherein a limited about of movement is allowed between the second indicator structure and the actuator.

7. The sealing unit of claim 6, wherein the actuator includes a handle threaded on a shaft.

8. The sealing unit of claim 1, wherein both the spring and an inner end of the actuator are adapted to fit within the first indicator structure.

9. The sealing unit of claim 1, wherein the second indicator structure does not engage the spring.

10. The sealing unit of claim 1, wherein the actuator can be set at different stable positions corresponding to different pressurization levels.

11. A sealing unit comprising:
a sealant;
a pressurization arrangement for pressurizing the sealant, the pressurization arrangement including a spring and an actuator for causing the spring to apply spring pressure to the sealant, the actuator including first and second pressurization components between which the sealant is axially pressurized; and
an actuation level indicator including a first indicator structure coupled to the first pressurization component such that the first indicator structure does not axially move relative to the first pressurization component during axial pressurization of the sealant axial and does not axially move relative to the first pressurization component in response to shrinkage of the sealant over time, the actuation level indicator also including a second indicator structure that moves relative to the first indicator structure when the actuator is actuated to axially pressurize the sealant between the first and second pressurization components, and wherein the second indicator structure connects with the first indicator structure such that the first and second indicator structures do not move axially relative to one another in response to shrinkage of the sealant over time.

12. The sealing unit of claim 11, wherein the first indicator structure is a first sleeve integrally connected with the first pressurization component.

13. The sealing unit of claim 12, wherein the spring is positioned inside the first sleeve.

14. The sealing unit of claim 13, wherein the second indicator structure is a second sleeve that mounts over the first sleeve.

15. The sealing unit of claim 14, wherein the first sleeve includes an indicium at an outer surface of the first sleeve that can be viewed relative to an axial position of the second sleeve to provide an indication of an actuation level of the actuator.

16. A sealing unit comprising:
a sealant;
a pressurization arrangement for pressurizing the sealant, the pressurization arrangement including a spring and an actuator for causing the spring to apply spring pressure to the sealant, the actuator including first and second pressurization components between which the sealant is axially pressurized; and
an actuation level indicator including a first indicator sleeve integrally formed with the first pressurization component, the actuation level indicator also including a second indicator sleeve mounted over the first indicator sleeve that moves relative to the first indicator sleeve when the actuator is actuated to axially pressurize the sealant between the first and second pressurization components, and wherein the second indicator sleeve connects with the first indicator sleeve such that the first and second indicator sleeves do not move axially relative to one another in response to shrinkage of the sealant over time.

17. The sealing unit of claim 16, wherein the spring is positioned in the first indicator sleeve.

18. The sealing unit of claim 17, wherein the first indicator sleeve includes an indicium at an outer surface of the first indicator sleeve that can be viewed relative to an axial position of the second indicator sleeve to provide an indication of an actuation level of the actuator.

* * * * *